United States Patent
Li et al.

(10) Patent No.: US 11,811,635 B2
(45) Date of Patent: Nov. 7, 2023

(54) NETWORK TRAFFIC MIGRATION METHOD AND APPARATUS

(71) Applicant: HUAWEI TECHNOLOGIES CO., LTD., Shenzhen (CN)

(72) Inventors: Weidong Li, Beijing (CN); Rongrong Hua, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 6 days.

(21) Appl. No.: 17/730,854

(22) Filed: Apr. 27, 2022

(65) Prior Publication Data

US 2022/0255828 A1    Aug. 11, 2022

Related U.S. Application Data

(63) Continuation of application No. PCT/CN2020/124341, filed on Oct. 28, 2020.

(30) Foreign Application Priority Data

Oct. 28, 2019    (CN) .......................... 201911032514.4

(51) Int. Cl.
*H04L 43/0882*    (2022.01)
*H04L 43/0811*    (2022.01)
*H04L 47/122*    (2022.01)
*H04L 47/22*    (2022.01)

(52) U.S. Cl.
CPC ...... *H04L 43/0882* (2013.01); *H04L 43/0811* (2013.01); *H04L 47/122* (2013.01); *H04L 47/22* (2013.01)

(58) Field of Classification Search
None
See application file for complete search history.

(56) References Cited

U.S. PATENT DOCUMENTS

| 9,148,376 B2 | 9/2015 | Jayawardena et al. |
| 2016/0301593 A1 | 10/2016 | Blair et al. |
| 2021/0092068 A1* | 3/2021 | Ismailsheriff ....... H04L 47/2441 |

(Continued)

FOREIGN PATENT DOCUMENTS

| CN | 101729424 A | 6/2010 |
| CN | 105704042 A | 6/2016 |

(Continued)

*Primary Examiner* — Angela Nguyen
(74) *Attorney, Agent, or Firm* — Rimon PC

(57) ABSTRACT

Embodiments of this application disclose a network traffic migration method and apparatus. The network traffic migration method includes: obtaining a bandwidth usage parameter value of each of M vBNG-UP network elements, where M is an integer greater than 1; when a bandwidth usage parameter value of a first vBNG-UP network element reaches a first threshold, determining a second vBNG-UP network element based on the sum of bandwidths occupied by to-be-migrated network traffic of one or more terminal devices in a first device group on the first vBNG-UP network element and a bandwidth usage parameter value of one or more vBNG-UP network elements in a vBNG-UP network element group; and migrating the to-be-migrated network traffic of the terminal devices in the first device group to the second vBNG-UP network element.

20 Claims, 10 Drawing Sheets

(56) References Cited

U.S. PATENT DOCUMENTS

2021/0211384 A1* 7/2021 Fraser .................. H04L 47/27
2022/0201552 A1* 6/2022 Kono .................. H04L 41/142

FOREIGN PATENT DOCUMENTS

| | | | |
|---|---|---|---|
| CN | 105872053 | A | 8/2016 |
| CN | 106657330 | A | 5/2017 |
| CN | 106936729 | A | 7/2017 |
| CN | 108271149 | A | 7/2018 |
| CN | 108881482 | A | 11/2018 |
| CN | 109428780 | A | 3/2019 |
| EP | 2485438 | A1 | 8/2012 |
| WO | 2013075598 | A1 | 5/2013 |
| WO | 2019042379 | A1 | 3/2019 |

\* cited by examiner

NETWORK TRAFFIC MIGRATION METHOD AND APPARATUS

CROSS-REFERENCE TO RELATED APPLICATIONS

This application is a continuation of International Application No. PCT/CN2020/124341, filed on Oct. 28, 2020, which claims priority to Chinese Patent Application No. 201911032514.4, filed on Oct. 28, 2019. The disclosures of the aforementioned applications are hereby incorporated by reference in their entireties.

TECHNICAL FIELD

This application relates to the communications field, and in particular, to a network traffic migration method and apparatus.

BACKGROUND

A communications network includes network elements such as virtual broadband network gateway control plane (vBNG-CP) network elements and virtual broadband network gateway user plane (vBNG-UP) network elements. One vBNG-CP network element can manage at least one vBNG-UP network element. When a terminal device requests to access the communications network, the vBNG-CP network element may select a vBNG-UP network element for the terminal device, and then the terminal device accesses the communications network through the vBNG-UP network element. After a user accesses the communications network, the vBNG-UP network element may be used to transmit network traffic of the terminal device.

Any one of the at least one vBNG-UP network element corresponds to a maximum quantity of terminal devices that are allowed for access. Assuming that the maximum quantity of terminal devices corresponding to a vBNG-UP network element is 100, it's an indication that the vBNG-UP network element allows access from a maximum 100 terminal devices. The vBNG-CP network element may obtain the current device usage of a vBNG-UP network element. The device usage is equal to the quantity of terminal devices that are currently accessing the vBNG-UP network element divided by the maximum quantity of terminal devices corresponding to the vBNG-UP network element. In this way, when a terminal device requests to access the communications network, the terminal device may send an authentication request to each of the at least one vBNG-UP network element, and each vBNG-UP network element sends the authentication request to the vBNG-CP network element. The vBNG-CP network element selects the vBNG-UP network element with the lowest device usage, and then controls the terminal device to access the communications network through the selected vBNG-UP network element, and then the selected vBNG-UP network element is used to transmit the network traffic of the terminal device.

In a process of implementing this application, the inventor finds that the related technology has at least the following problem:

In the foregoing solution, device usage can be balanced among different vBNG-UP network elements. However, different network traffic consumes different bandwidths. Some network traffic consumes relatively high bandwidth, and some network traffic consumes relatively low bandwidth. In this case, the sum of bandwidths consumed by the network traffic transmitted on some vBNG-UP network elements may approach or reach the total bandwidth of the vBNG-UP network elements, causing problems such as traffic congestion.

SUMMARY

This application provides a network traffic migration method and apparatus, which can avoid the problem that the total occupied bandwidth of a vBNG-UP network element approaches or reaches the total bandwidth of the vBNG-UP network element. The technical solutions are as follows.

According to a first aspect, this application provides a network traffic migration method. The method includes: obtaining a bandwidth usage parameter value of each of M virtual broadband network gateway user plane (vBNG-UP) network elements, where M is an integer greater than 1; when a bandwidth usage parameter value of a first vBNG-UP network element reaches a first threshold, determining a second vBNG-UP network element based on a sum of bandwidths occupied by to-be-migrated network traffic of one or more terminal devices in a first device group on the first vBNG-UP network element and a bandwidth usage parameter value of one or more vBNG-UP network elements in a vBNG-UP network element group, where the first vBNG-UP network element and the second vBNG-UP network element are vBNG-UP network elements in the M vBNG-UP network elements, and the vBNG-UP network element group includes vBNG-UP network elements in the M vBNG-UP network elements except the first vBNG-UP network element; and migrating the to-be-migrated network traffic of the terminal devices in the first device group to the second vBNG-UP network element. The to-be-migrated network traffic of the terminal devices in the first device group may be migrated from the first vBNG-UP network element to the second vBNG-UP network element. This can avoid the problem that the sum of bandwidths occupied by the network traffic on the first vBNG-UP network element approaches or reaches the total bandwidth of the first vBNG-UP network element, and further avoids a problem such as traffic congestion on the first vBNG-UP network element. In addition, the second vBNG-UP network element is determined based on the sum of bandwidths occupied by the to-be-migrated network traffic of the terminal devices in the first device group on the first vBNG-UP network element and the bandwidth usage parameter value of the vBNG-UP network elements in the vBNG-UP network element group. In this way, the to-be-migrated network traffic of the terminal devices in the first device group is migrated to the second vBNG-UP network element. Therefore, after the network traffic is migrated to the second vBNG-UP network element, it is avoided that the sum of bandwidths occupied by the network traffic on the second vBNG-UP network element approaches or reaches the total bandwidth of the first vBNG-UP network element, and a problem such as traffic congestion on the second vBNG-UP network element is also avoided.

In a possible implementation, a bandwidth usage parameter value of any one of the M vBNG-UP network elements includes a bandwidth usage parameter value of each interface on the vBNG-UP network element. In this way, the network traffic can be migrated with a granularity of an interface.

In another possible implementation, when a bandwidth usage parameter value of a first interface on the first vBNG-UP network element reaches the first threshold, a bandwidth usage parameter value of a second interface after the network traffic of the terminal devices in the first device group is migrated to the second interface is predicted based on the sum of bandwidths occupied by the network traffic of the terminal devices in the first device group and a bandwidth usage parameter value of the second interface. When the predicted bandwidth usage parameter value reaches a second threshold, it is determined that a vBNG-UP network element on which the second interface is located is the second vBNG-UP network element, where the second interface is an interface on a vBNG-UP network element in the vBNG-UP network element group, and the network traffic of the terminal devices in the first device group is the network traffic transmitted on the first interface. Before the network traffic is migrated to the second interface, the bandwidth usage parameter value of the second interface after the migration is predicted. When the predicted bandwidth usage parameter value reaches the second threshold, the network traffic is migrated to the second interface. This avoids the problem that the bandwidth usage parameter value of the second interface also reaches the first threshold after the network traffic is migrated.

In another possible implementation, the network traffic of the terminal devices in the first device group is migrated to the second interface.

In another possible implementation, the occupied bandwidth of the second interface is obtained based on the total bandwidth corresponding to the second interface and the bandwidth usage parameter value of the second interface; and the bandwidth usage parameter value of the second interface after the network traffic of the terminal devices in the first device group is migrated to the second interface is obtained based on the sum of bandwidths occupied by the network traffic of the terminal devices in the first device group and the occupied bandwidth of the second interface. In this way, the bandwidth usage parameter value of the second interface after the network traffic is migrated to the second interface can be predicted.

In another possible implementation, the vBNG-UP network elements in the vBNG-UP network element group are standby vBNG-UP network elements of the first vBNG-UP network element, the standby vBNG-UP network elements include standby interfaces corresponding to the first interface, and an address segment of the standby interface includes an address segment of the first interface. An interface is selected from the standby interfaces corresponding to the first interface as the second interface.

In another possible implementation, the first interface is a network-side interface on the first vBNG-UP network element, and the network traffic of the terminal devices in the first device group is network traffic transmitted on a user-side interface corresponding to the first interface on the first vBNG-UP network element. In this way, when the first interface is a network-side interface, a consumed bandwidth of the first interface can be reduced by migrating the network traffic on the user-side interface corresponding to the first interface. This avoids the problem that the bandwidth usage parameter value of the first interface reaches the first threshold.

In another possible implementation, the first interface includes a plurality of sub-interfaces, and the network traffic of the terminal devices in the first device group is network traffic transmitted on a sub-interface of the first interface. In this way, the network traffic can be migrated with a granularity of a sub-interface.

In another possible implementation, the bandwidth usage parameter value of the first interface on the first vBNG-UP network element is obtained; and when the bandwidth usage parameter value of the first interface reaches a third threshold, the network traffic of the terminal devices in the first device group is migrated back to the first interface on the first vBNG-UP network element.

In another possible implementation, a bandwidth usage parameter value of the first interface after the network traffic of the terminal devices in the first device group is migrated back to the first interface is predicted; and when the predicted bandwidth usage parameter value reaches a fourth threshold, the network traffic of the terminal devices in the first device group is migrated back to the first interface on the first vBNG-UP network element. Before the network traffic is migrated back to the first interface, the bandwidth usage parameter value of the first interface after the migration is predicted. When the predicted bandwidth usage parameter value reaches the fourth threshold, the network traffic is migrated to the first interface. This avoids the problem that the bandwidth usage parameter value of the first interface also reaches the first threshold after the network traffic is migrated.

In another possible implementation, a first migration request message is sent to a virtual broadband network gateway control plane (vBNG-CP) network element, where the first migration request message includes a device identifier of the first vBNG-UP network element, an interface identifier of the first interface, a device identifier of the second vBNG-UP network element, and an interface identifier of the second interface, and the first migration request message is used to trigger the vBNG-CP network element to migrate, to the second interface, the network traffic of the terminal devices that is transmitted on the first interface. In this way, the network traffic of the terminal devices in the first device group on the first vBNG-UP network element is migrated to the second interface on the second vBNG-UP network element.

In another possible implementation, a second migration request message is sent to the second vBNG-UP network element, where the second migration request message includes device information of the terminal devices in the first device group and an interface identifier of the second interface, the device information of the terminal devices includes device identifiers of the terminal devices, and the second migration request message is used to trigger the second vBNG-UP network element to migrate, based on the device information of the terminal devices in the first device group and the interface identifier of the second interface, the network traffic of the terminal devices in the first device group to the second interface. In this way, the network traffic of the terminal devices in the first device group on the first vBNG-UP network element is migrated to the second interface on the second vBNG-UP network element.

In another possible implementation, the vBNG-UP network element group further includes the first vBNG-UP network element, the first vBNG-UP network element is the second vBNG-UP network element, the second interface is an interface on the first vBNG-UP network element, and the first interface is different from the second interface. In this way, the network traffic can be migrated between different interfaces on the vBNG-UP network element.

According to a second aspect, this application provides a network traffic migration apparatus, configured to perform the method according to any one of the first aspect or the possible implementations of the first aspect. Specifically, the apparatus includes a unit configured to perform the method according to any one of the first aspect or the possible implementations of the first aspect.

According to a third aspect, this application provides a network traffic migration apparatus. The apparatus includes a processor, a memory, and a transceiver. The processor, the memory, and the transceiver may be connected through a bus system. The memory is configured to store one or more programs, and the processor is configured to execute the one or more programs in the memory to enable the migration apparatus to complete the method according to any one of the first aspect or the possible implementations of the first aspect.

According to a fourth aspect, this application provides a computer-readable storage medium. The computer-readable storage medium stores computer instructions, and when the computer instructions are run on a computer, the computer is enabled to perform the method according to any one of the first aspect or the possible implementations of the first aspect.

According to a fifth aspect, this application provides a computer program product including program code. When the program code is run on a computer, the computer is enabled to perform the method according to any one of the first aspect or the possible implementations of the first aspect.

DESCRIPTION OF EMBODIMENTS

Figure 1:
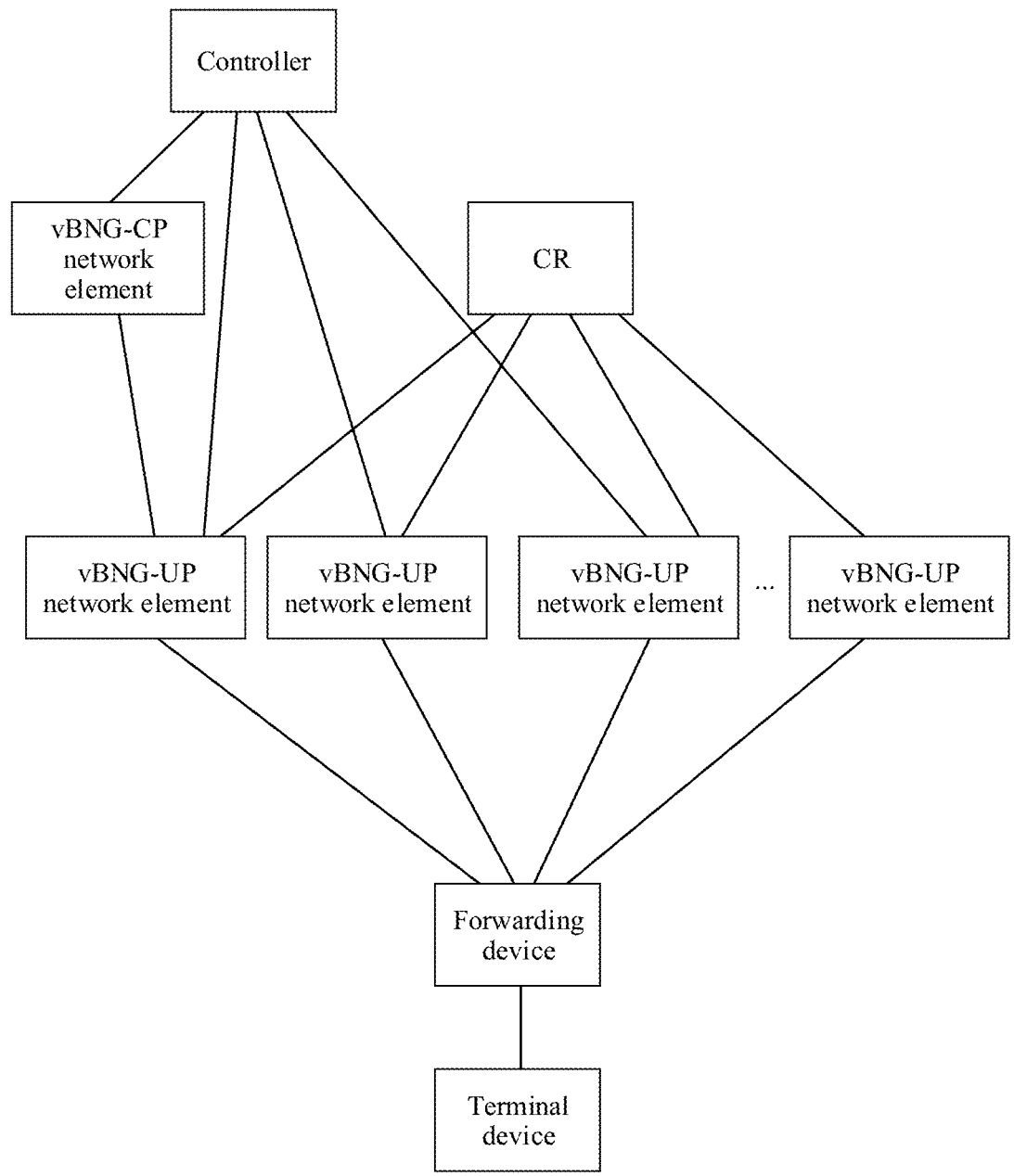
FIG. 1 is a schematic diagram of a network architecture according to an embodiment of this application.

FIG. 1 shows a network architecture provided in an embodiment of the present disclosure. The network architecture includes a controller, a vBNG-CP network element, a core router (CR), a forwarding device, and a plurality of vBNG-UP network elements.

Optionally, the forwarding device may be a switch (SW), an optical line termination (OLT), or the like.

Any one of the plurality of vBNG-UP network elements includes at least one interface, and each interface includes at least one sub-interface. Each interface on the vBNG-UP network element includes a user-side interface and a network-side interface, and each sub-interface on the vBNG-UP network element includes a user-side sub-interface and a network-side sub-interface. The vBNG-UP network element may be connected to devices such as the vBNG-CP network element, the CR, and the controller through the network-side interface, and may be connected to the forwarding device through the user-side interface.

The vBNG-UP network element further configures at least one address segment for each interface on the vBNG-UP network element, and configures at least one address segment for each sub-interface of the interface. The address segment of the interface includes the address segment of each sub-interface of the interface. When the vBNG-UP network element is connected to the CR, for an address segment of any sub-interface or an address segment of any interface on the vBNG-UP network element, the CR stores routing information including the address segment, the routing information includes the address segment and next-hop information, and the next-hop information includes a device identifier of the vBNG-UP network element and the like.

Optionally, the device identifier of the vBNG-UP network element may be an address of the vBNG-UP network element or the like.

Optionally, when requesting to access a communications network, a terminal device may send an authentication request to each of the plurality of vBNG-UP network elements through the forwarding device. Each vBNG-UP network element receives the authentication request, and sends the authentication request to the vBNG-CP network element.

The vBNG-CP network element receives the authentication request of the terminal device that is sent by each vBNG-UP network element, selects one vBNG-UP network element from the plurality of vBNG-UP network elements, selects a sub-interface on the vBNG-UP network element, and allocates an address to the terminal device, where the allocated address is an address in the address segment of the sub-interface. Then, the vBNG-CP network element indicates the selected vBNG-UP network element to send a response packet to the terminal device, where the response packet includes a device identifier of the vBNG-UP network element.

The terminal device receives the response packet sent by the vBNG-UP network element, then accesses the vBNG-UP network element through the forwarding device, and accesses a core network through the vBNG-UP network element. Then, the vBNG-UP network element may transmit network traffic of the terminal device through the sub-interface.

The network traffic of the terminal device includes downlink network traffic and uplink network traffic. The terminal device sends the uplink network traffic to the vBNG-UP network element based on the device identifier of the vBNG-UP network element. The vBNG-UP network element receives the uplink network traffic through the sub-interface, and sends the uplink network traffic to the CR. When the CR has downlink network traffic to be sent to the terminal device, the CR obtains, based on the address of the terminal device that is included in the downlink network traffic, a target address segment including the address, and obtains routing information including the target address segment. The CR sends the downlink network traffic to the vBNG-UP network element based on next-hop information included in the routing information. The vBNG-UP network element sends the downlink network traffic to the terminal device based on the address of the terminal device that is included in the downlink network traffic. In this way, the vBNG-UP network element transmits the network traffic of the terminal device.

It should be noted that the total bandwidth of any one of the plurality of vBNG-UP network elements is fixed. In this way, when the sum of bandwidths consumed by the network traffic of the terminal devices that is transmitted on the vBNG-UP network element reaches or approaches the total bandwidth of the vBNG-UP network element, problems may occur on the vBNG-UP network element. For example, traffic congestion may occur on the vBNG-UP network element. Consequently, the vBNG-UP network element cannot transmit the network traffic of the terminal devices.

To avoid problems such as traffic congestion that are caused by large consumption of the bandwidth of the first vBNG-UP network element, the controller may be configured to: obtain a bandwidth usage parameter value of M vBNG-UP network elements, where M is an integer greater than 1; when a bandwidth usage parameter value of a vBNG-UP network element reaches a first threshold, for ease of description, the vBNG-UP network element is referred to as a first vBNG-UP network element, determine a second vBNG-UP network element based on a sum of bandwidths occupied by the to-be-migrated network traffic of the terminal devices in a first device group on the first vBNG-UP network element and a bandwidth usage parameter value of vBNG-UP network elements in a vBNG-UP network element group, where the vBNG-UP network element group includes vBNG-UP network elements in the M vBNG-UP network elements except the first vBNG-UP network element; and migrate the to-be-migrated network traffic of the terminal devices in the first device group to the second vBNG-UP network element.

Figure 2A:
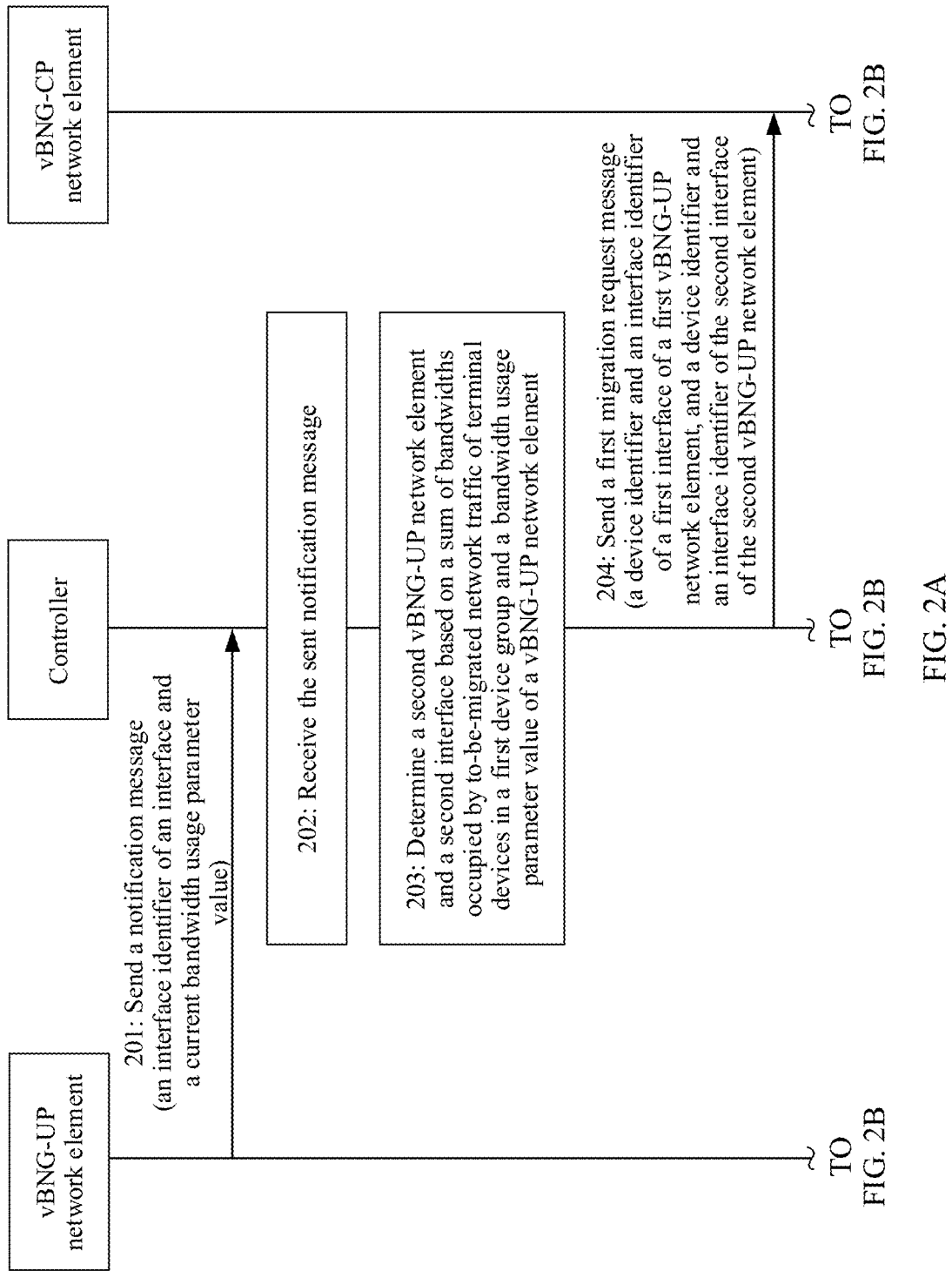
FIG. 2A and FIG. 2B show a flowchart of a network traffic migration method according to an embodiment of this application.
Figure 2B:
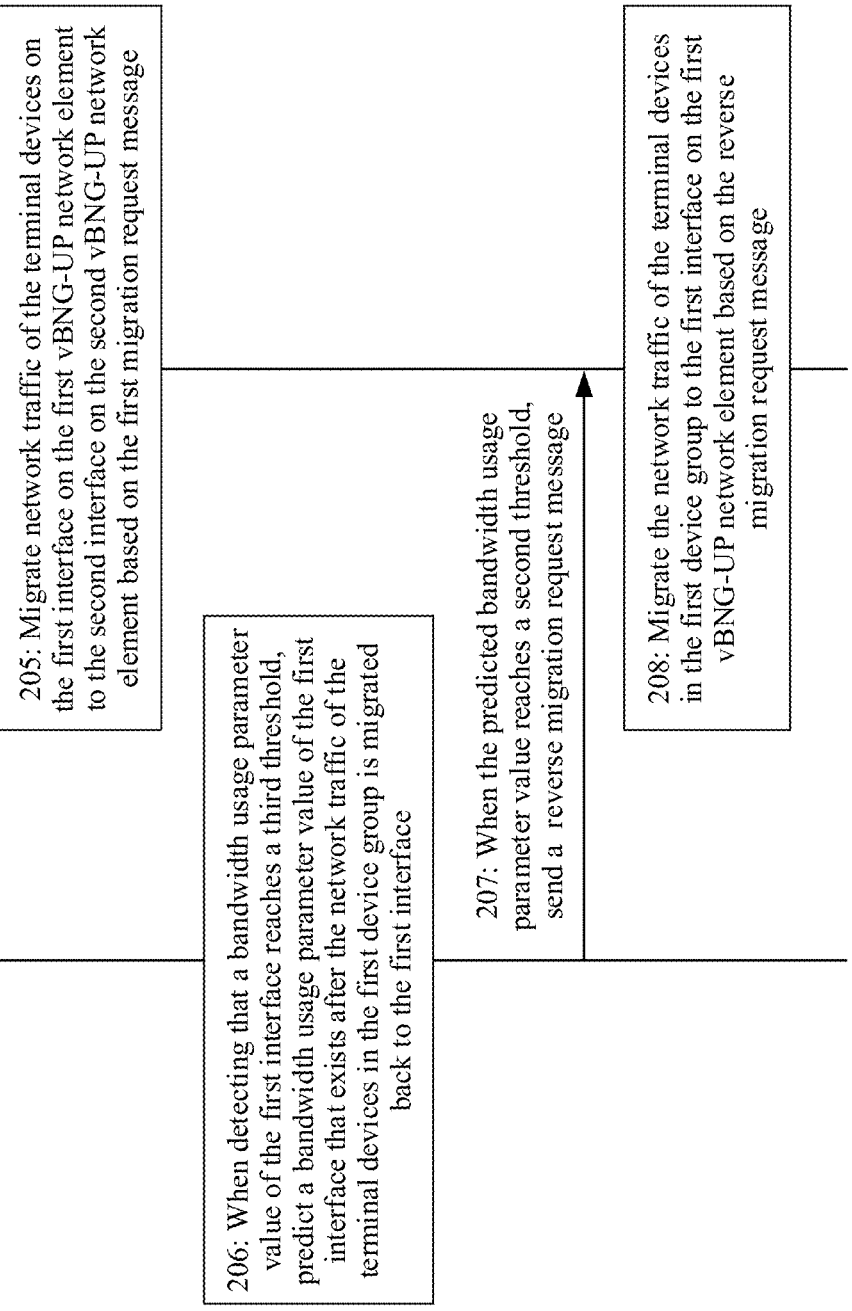
Figure 6:
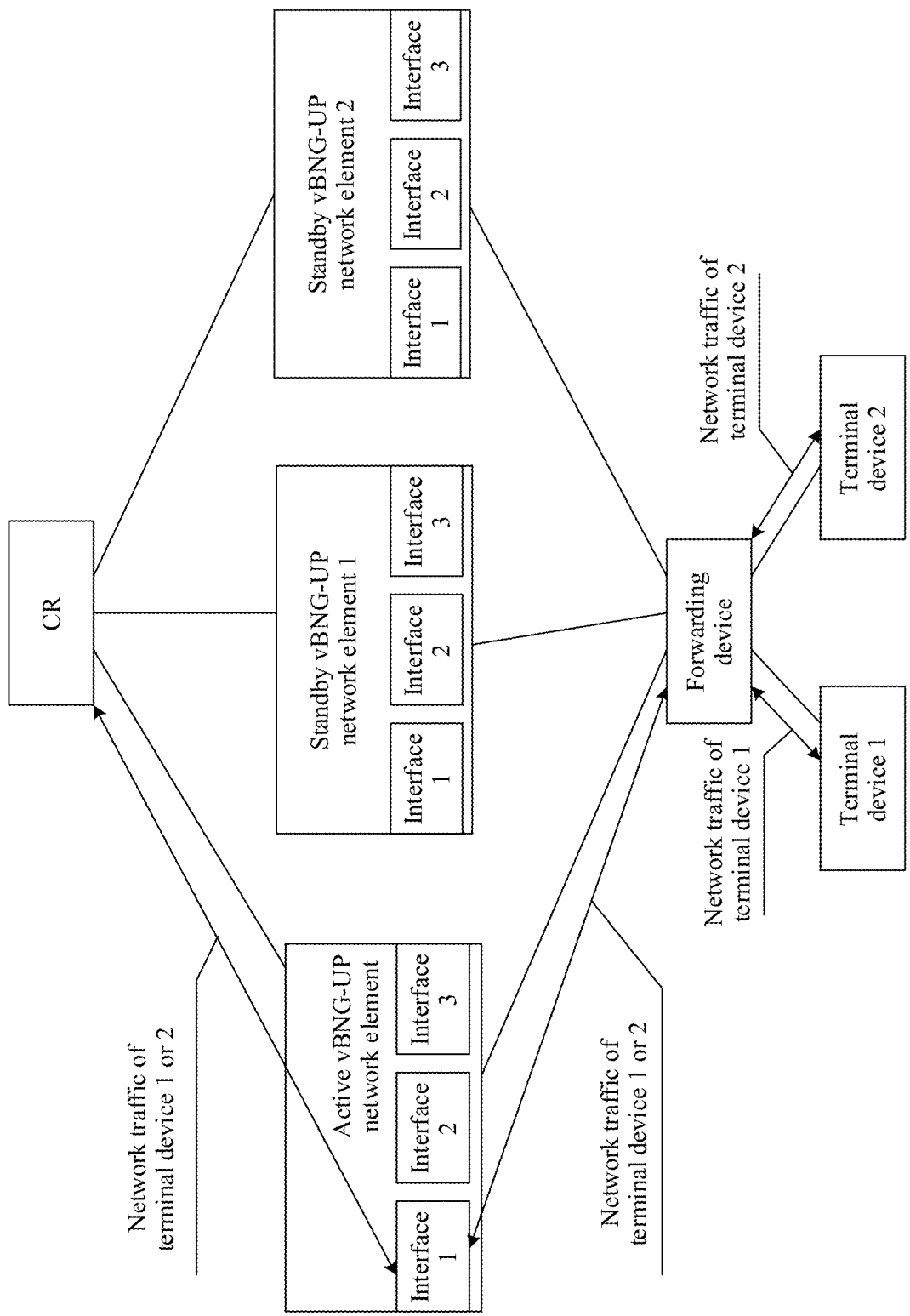
FIG. 6 is a schematic diagram of paths in which network traffic of terminal devices in a first device group is transmitted before the network traffic is migrated from an active vBNG-UP network element according to an embodiment of this application.

A detailed implementation process of migrating the network traffic by the controller is described in detail in a subsequent embodiment shown in FIG. 2A and FIG. 2B or FIG. 6, and is not described here.

Optionally, the bandwidth usage parameter of the vBNG-UP network element may be bandwidth usage, a remaining idle bandwidth, or the like. When the bandwidth usage parameter is the bandwidth usage, that the bandwidth usage parameter value of the first vBNG-UP network element reaches the first threshold means that the bandwidth usage parameter of the first vBNG-UP network element exceeds the first threshold. When the bandwidth usage parameter is the remaining idle bandwidth, that the bandwidth usage parameter value of the first vBNG-UP network element reaches the first threshold means that the remaining idle bandwidth of the first vBNG-UP network element is less than the first threshold.

Optionally, the M vBNG-UP network elements are some or all vBNG-UP network elements in the network architecture, and the M vBNG-UP network elements may be responsible for handling access from terminal devices in a same area. The controller may define the M vBNG-UP network elements as a set. In this way, when the bandwidth usage parameter value of any one of the M vBNG-UP network elements reaches the first threshold, network traffic of terminal devices in one or more device groups on the vBNG-UP network element is migrated to another vBNG-UP network element in the set.

Optionally, the controller classifies vBNG-UP network elements in the network architecture into two types: an active vBNG-UP network element and a standby vBNG-UP network element, and defines a backup group for each active vBNG-UP network element. The backup group includes at least one standby vBNG-UP network element corresponding to the active vBNG-UP network element. The M vBNG-UP network elements include the active vBNG-UP network element and a vBNG-UP network element in the backup group. In this way, when a bandwidth usage parameter value of the active vBNG-UP network element reaches the first threshold, network traffic of terminal devices in one or more device groups on the active vBNG-UP network element is migrated to the standby vBNG-UP network element in the backup group.

One active vBNG-UP network element corresponds to at least one standby vBNG-UP network element. Any interface on the active vBNG-UP network element corresponds to a standby interface on each standby vBNG-UP network element, and an address segment of the standby interface on each vBNG-UP network element includes an address segment of the interface. In addition, any sub-interface of the interface corresponds to a standby sub-interface on each standby vBNG-UP network element, and an address segment of the standby sub-interface on each standby vBNG-UP network element includes an address segment of the sub-interface.

Optionally, one standby vBNG-UP network element may be included in different backup groups. In other words, one standby vBNG-UP network element may correspond to at least one active vBNG-UP network element. Any standby interface on the standby vBNG-UP network element corresponds to an interface on each active vBNG-UP network element, and an address segment of the standby interface includes an address segment of each interface corresponding to the standby interface. In addition, any standby sub-interface of the standby interface corresponds to a sub-interface on each active vBNG-UP network element, and an address segment of the standby sub-interface includes an address segment of each sub-interface corresponding to the standby sub-interface.

Both the active vBNG-UP network element and the at least one standby vBNG-UP network element corresponding to the active vBNG-UP network element are connected to the CR. When the active vBNG-UP network element is connected to the CR, there are a plurality of pieces of routing information in the CR that include an address segment of any interface or an address segment of any sub-interface on the active vBNG-UP network element. The plurality of pieces of routing information include different next-hop information. Some next-hop information includes a device identifier of the active vBNG-UP network element, and some next-hop information includes a device identifier of the standby vBNG-UP network element corresponding to the active vBNG-UP network element. However, in the plurality of pieces of routing information, the routing information of which the next-hop information includes the device identifier of the active vBNG-UP network element has a highest priority. When the CR sends the downlink network traffic, if the CR obtains the plurality of pieces of routing information, the CR sends the downlink network traffic based on the routing information with the highest priority.

Optionally, the controller may be integrated into the vBNG-CP network element. In this way, the controller and the vBNG-CP network element are combined into one device, and the vBNG-CP network element has a function of the controller. In this way, the network architecture may not include the controller. The terminal device may be a mobile phone, a computer, a tablet computer, or another device.

FIG. 2A and FIG. 2B show a network traffic migration method provided in an embodiment of this application. The method may be applied to the network architecture shown in FIG. 1. In the method, some or all vBNG-UP network elements in the network architecture may form a set, and the set includes M vBNG-UP network elements. The controller or the vBNG-CP network element may migrate network traffic between the M vBNG-UP network elements. This avoids the problem that the total consumed bandwidth of a vBNG-UP network element reaches or approaches the total bandwidth corresponding to the vBNG-UP network element. The method includes the following steps.

Step 201: A vBNG-UP network element obtains a current bandwidth usage parameter value of each interface on the vBNG-UP network element, and sends a notification message to the controller, where the notification message includes an interface identifier and the current bandwidth usage parameter value of each interface on the vBNG-UP network element.

In some embodiments of this application, an example in which the controller migrates the network traffic is described. If the vBNG-CP network element is used to migrate the network traffic, the controller is integrated into the vBNG-CP network element. In some embodiments in which the vBNG-CP network element migrates the network traffic, the network architecture may contain the vBNG-CP network element instead of a controller.

The vBNG-UP network element may be any one of the M vBNG-UP network elements.

The vBNG-UP network element may periodically or aperiodically obtain the bandwidth usage parameter value of each interface on the vBNG-UP network element. Each time the bandwidth usage parameter value of each interface on the vBNG-UP network element is obtained, the vBNG-UP network element sends the bandwidth usage parameter value of each interface on the vBNG-UP network element to the controller.

Optionally, the vBNG-UP network element may obtain a bandwidth usage parameter value of any interface on the vBNG-UP network element in the following manner.

The vBNG-UP network element obtains bandwidths occupied by the network traffic of the terminal devices that is currently transmitted on the interface and summates the bandwidths occupied by the network traffic of the terminal devices to obtain an occupied bandwidth of the interface, and calculates current bandwidth usage of the interface or a remaining idle bandwidth of the interface based on the occupied bandwidth of the interface and a total bandwidth corresponding to the interface. The occupied bandwidth of the interface is divided by the total bandwidth corresponding to the interface to obtain the current bandwidth usage of the interface; or the occupied bandwidth of the interface is subtracted from the total bandwidth corresponding to the interface to obtain the remaining idle bandwidth of the interface. For example, assuming that the sum of the bandwidths is a, and the total bandwidth corresponding to the interface is b, the current bandwidth usage of the interface is calculated as a/b; or the remaining idle bandwidth of the interface is calculated as b-a.

Optionally, the interface includes at least one sub-interface. Generally, the interface may include dozens of sub-interfaces or hundreds of sub-interfaces. Any one of the at least one sub-interface may transmit network traffic of at least one terminal device. Therefore, the vBNG-UP network element usually includes a large quantity of sub-interfaces.

The vBNG-UP network element may also obtain a bandwidth usage parameter value of each sub-interface on the vBNG-UP network element. The notification message sent to the controller may further include an interface identifier and the bandwidth usage parameter value of each sub-interface.

A bandwidth usage parameter value of any sub-interface may be obtained based on a total bandwidth corresponding to the sub-interface and bandwidths occupied by network traffic of the terminal devices that is transmitted on the sub-interface. For a detailed obtaining process, refer to the foregoing process of obtaining the bandwidth usage parameter value of the interface. Details are not described herein again.

Because the vBNG-UP network element includes a large quantity of sub-interfaces, if the bandwidth usage parameter value of each sub-interface on the vBNG-UP network element is obtained, the obtained data size is very large. Therefore, in an embodiment of this application, after the bandwidth usage parameter value of each interface on the vBNG-UP network element is obtained, the bandwidth usage parameter value of each sub-interface on the vBNG-UP network element is no longer obtained, to reduce the obtained data size.

Optionally, the notification message may further include an occupied bandwidth of each interface on the vBNG-UP network element and/or an occupied bandwidth of each sub-interface on the vBNG-UP network element.

Optionally, the interface may be a network-side interface or a user-side interface on the vBNG-UP network element. In other words, the vBNG-UP network element may obtain a bandwidth usage parameter value of each network-side interface and/or a bandwidth usage parameter value of each user-side interface on the vBNG-UP network element. The notification message includes an interface identifier and the bandwidth usage parameter value of each network-side interface and/or an interface identifier and the bandwidth usage parameter value of each user-side interface.

Another vBNG-UP network element in the M vBNG-UP network elements also obtains the information such as the interface identifier and the bandwidth usage parameter value of each interface in the manner in this step, and the other vBNG-UP network element sends a notification message to the controller. The notification message includes the information such as the interface identifier and the bandwidth usage parameter value of each interface.

Optionally, when the vBNG-CP network element is used to migrate the network traffic, the vBNG-UP network element sends the notification message to the vBNG-CP network element. The notification message includes the information such as the interface identifier and the bandwidth usage parameter value of each interface on the vBNG-UP network element.

Step 202: The controller receives the notification message sent by the vBNG-UP network element, where the notification message includes the interface identifier and the bandwidth usage parameter value of each interface on the vBNG-UP network element.

The controller may receive a notification message sent by each of the M vBNG-UP network elements.

Step 203: When a bandwidth usage parameter value of a first interface on a first vBNG-UP network element reaches a first threshold, the controller determines a second vBNG-UP network element and a second interface on the second vBNG-UP network element based on a sum of bandwidths occupied by to-be-migrated network traffic of terminal devices in a first device group on the first vBNG-UP network element and a bandwidth usage parameter value of a vBNG-UP network element in a vBNG-UP network element group.

Optionally, the to-be-migrated network traffic of the terminal devices in the first device group is network traffic transmitted on the first interface. Optionally, the network traffic of the terminal devices in the first device group is all network traffic transmitted on the first interface, or the network traffic of the terminal devices in the first device group is network traffic transmitted on a first sub-interface. The first sub-interface is a sub-interface of the first interface.

Optionally, when the first interface is a network-side interface, the network traffic of the terminal devices in the first device group is network traffic transmitted on a user-side interface corresponding to the network-side interface, and the second interface is also a user-side interface.

Optionally, the vBNG-UP network element group includes vBNG-UP network elements in the M vBNG-UP network elements except the first vBNG-UP network element. A quantity of the vBNG-UP network elements included in the vBNG-UP network element group may be greater than or equal to 1 and less than or equal to M−1. Alternatively, the vBNG-UP network element group may further include the first vBNG-UP network element. When the vBNG-UP network element group includes the first vBNG-UP network element, the first vBNG-UP network element and the second vBNG-UP network element may be a same vBNG-UP network element, and the first interface and the second interface are two different interfaces on the first vBNG-UP network element. In this way, the network traffic of the terminal devices in the first device group can be migrated from the first interface to the second interface.

Optionally, the first vBNG-UP network element is any vBNG-UP network element in the M vBNG-UP network elements, and the first interface is an interface that is included in the first vBNG-UP network element and of which the bandwidth usage parameter value reaches the first threshold.

Optionally, when the bandwidth usage parameter is the bandwidth usage, the first interface is an interface that is included in the first vBNG-UP network element and of which the bandwidth usage parameter exceeds the first threshold.

Optionally, when the bandwidth usage parameter is the remaining idle bandwidth, the first interface is an interface that is included in the first vBNG-UP network element and of which the remaining idle bandwidth is less than the first threshold.

This step may be implemented through the following operations 2031 to 2033.

2031: The controller obtains the sum of bandwidths occupied by the network traffic of the terminal devices in the first device group.

When the network traffic of the terminal devices in the first device group is all network traffic transmitted on the first interface, the controller obtains, based on a device identifier of the first vBNG-UP network element and an interface identifier of the first interface, the total bandwidth corresponding to the first interface, and obtains, based on the bandwidth usage parameter value of the first interface and the total bandwidth corresponding to the first interface, the sum of bandwidths occupied by the network traffic of the terminal devices in the first device group. Alternatively, when a notification message sent by the first vBNG-UP network element further includes an occupied bandwidth of the first interface, the occupied bandwidth of the first interface is used as the sum of bandwidths occupied by the network traffic of the terminal devices in the first device group.

When the network traffic of the terminal devices in the first device group is network traffic transmitted on the first sub-interface of the first interface, the controller obtains, based on the device identifier of the first vBNG-UP network element and an interface identifier of the first sub-interface, the total bandwidth corresponding to the first sub-interface, and obtains, based on a bandwidth usage parameter value of the first sub-interface and the total bandwidth corresponding to the first sub-interface, the sum of bandwidths occupied by the network traffic of the terminal devices in the first device group. Alternatively, when a notification message sent by the first vBNG-UP network element further includes an occupied bandwidth of the first sub-interface, the occupied bandwidth of the first sub-interface is used as the sum of bandwidths occupied by the network traffic of the terminal devices in the first device group.

Optionally, the controller stores a correspondence among device identifiers of the vBNG-UP network elements, interface identifiers, and total bandwidths. Any record in the correspondence includes a device identifier of a vBNG-UP network element, an interface identifier of an interface on the vBNG-UP network element, and a total bandwidth of the interface, or the record includes a device identifier of a vBNG-UP network element, an interface identifier of a sub-interface on the vBNG-UP network element, and a total bandwidth of the sub-interface. In this way, the controller may obtain, from the correspondence and based on the device identifier of the first vBNG-UP network element and the interface identifier of the first interface, the total bandwidth corresponding to the first interface. Alternatively, the controller may obtain, from the correspondence and based on the device identifier of the first vBNG-UP network element and the interface identifier of the first sub-interface, the total bandwidth corresponding to the first sub-interface.

2032: The controller predicts a bandwidth usage parameter value of a target interface after the network traffic of the terminal devices in the first device group is migrated to the target interface, where the target interface is an interface on the vBNG-UP network element, and the vBNG-UP network element is any vBNG-UP network element in the vBNG-UP network element group.

The controller may select a vBNG-UP network element from the vBNG-UP network element group, and select an interface from the interfaces on the vBNG-UP network element as the target interface. The controller obtains, based on the device identifier of the vBNG-UP network element and an interface identifier of the target interface, a total bandwidth corresponding to the target interface. The controller obtains, based on the bandwidth usage parameter value of the target interface and the total bandwidth corresponding to the target interface, an occupied bandwidth of the target interface. Alternatively, when the notification message sent by the vBNG-UP network element further includes the occupied bandwidth of the target interface, the controller obtains the occupied bandwidth of the target interface from the notification message. The controller obtains, based on the sum of bandwidths occupied by the network traffic of the terminal devices in the first device group and the occupied bandwidth of the target interface, the bandwidth usage parameter value of the target interface after the network traffic of the terminal devices in the first device group is migrated to the target interface.

The bandwidth usage parameter value of each interface on each vBNG-UP network element in the vBNG-UP network element group can be predicted in the foregoing manner.

2033: When the predicted bandwidth usage parameter value of the target interface reaches a second threshold, the controller may determine a vBNG-UP network element on which the target interface is located as the second vBNG-UP network element, and use the target interface as the second interface.

When the bandwidth usage parameter value is the bandwidth usage, and the predicted bandwidth usage of the target interface is less than the second threshold, the controller determines the vBNG-UP network element on which the target interface is located as the second vBNG-UP network element, and uses the target interface as the second interface. In this case, the second threshold is less than or equal to the first threshold.

Optionally, the controller selects an interface with the smallest predicted bandwidth usage from the interfaces on each vBNG-UP network element in the vBNG-UP network element group as the second interface, where the smallest bandwidth usage is less than the second threshold, and uses a vBNG-UP network element on which the second interface is located as the second vBNG-UP network element.

When the bandwidth usage parameter is the remaining idle bandwidth, and the predicted remaining idle bandwidth of the target interface is greater than the second threshold, the controller determines the vBNG-UP network element on which the target interface is located as the second vBNG-UP network element, and uses the target interface as the second interface. In this case, the second threshold is greater than or equal to the first threshold.

Optionally, the controller selects a largest remaining idle bandwidth from the predicted remaining idle bandwidths corresponding to the interfaces on each vBNG-UP network element in the vBNG-UP network element group. When the largest remaining idle bandwidth is greater than the second threshold, the controller uses an interface corresponding to the largest remaining idle bandwidth as the second interface, and uses the vBNG-UP network element on which the second interface is located as the second vBNG-UP network element.

Step 204: The controller sends a first migration request message to the vBNG-CP network element, where the first migration request message includes the device identifier of the first vBNG-UP network element, the interface identifier of the first interface, a device identifier of the second vBNG-UP network element, and an interface identifier of the second interface.

Figure 3:
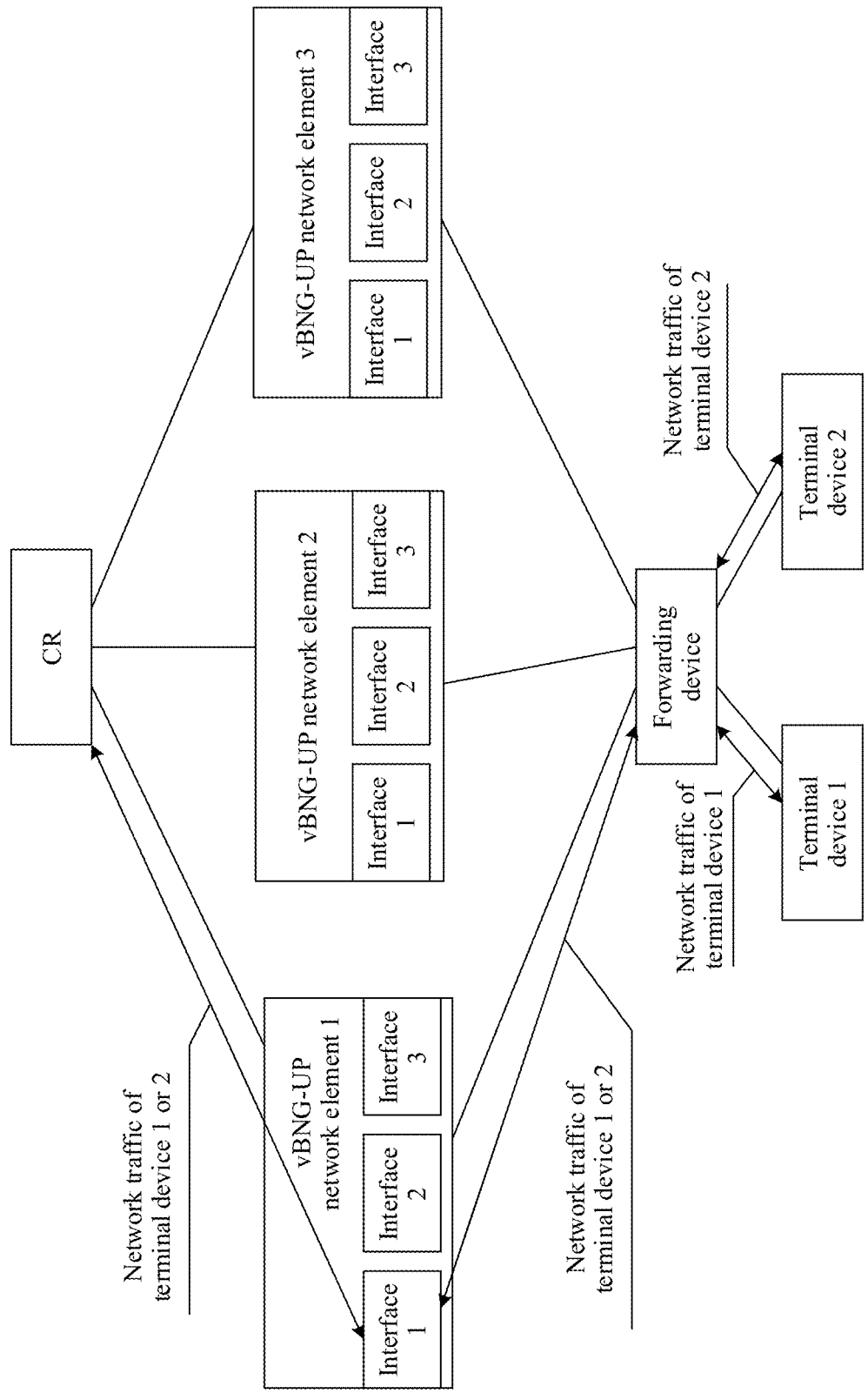
FIG. 3 is a schematic diagram of paths in which network traffic of terminal devices in a first device group is transmitted before the network traffic is migrated according to an embodiment of this application.

For example, as shown in FIG. 3, it is assumed that M is equal to 3, that is, there are three vBNG-UP network elements: vBNG-UP network elements 1, 2, and 3. The vBNG-UP network element 1 includes an interface 1, an interface 2, and an interface 3, the vBNG-UP network element 2 includes an interface 1, an interface 2, and an interface 3, and the vBNG-UP network element 3 also includes an interface 1, an interface 2, and an interface 3. It is assumed that a bandwidth usage parameter value of the interface 1 of the vBNG-UP network element 1 reaches the first threshold. It is predicted that a bandwidth usage parameter value of the interface 2 of the vBNG-UP network element 2 reaches the second threshold.

In this scenario, the controller may send a first migration request message to the vBNG-CP network element. The first migration request message includes a device identifier UP network element 1 and an interface identifier F1 of the interface 1 of the vBNG-UP network element 1, and a device identifier UP network element 2 and an identifier F2 of the interface 2 of the vBNG-UP network element 2.

Optionally, when the network traffic of the terminal devices in the first device group is network traffic transmitted on the first sub-interface of the first interface, the first migration request message includes the device identifier of the first vBNG-UP network element, the interface identifier of the first sub-interface, the device identifier of the second vBNG-UP network element, and an interface identifier of a second sub-interface, and the second sub-interface is a sub-interface of the second interface.

Optionally, before sending the first migration request message, the controller may select a sub-interface from the sub-interfaces of the second interface as the second sub-interface. Alternatively, a sub-interface is selected from the sub-interfaces of the second interface, and a bandwidth usage parameter value of the sub-interface after the network traffic of the terminal devices in the first device group is migrated to the sub-interface is predicted. When the bandwidth usage parameter value reaches the second threshold, the sub-interface is used as the second sub-interface. For a prediction process, refer to the foregoing process of predicting the bandwidth usage parameter value of the target interface. Details are not described herein again.

Optionally, when the bandwidth usage parameter is the bandwidth usage, the bandwidth usage of each sub-interface of the second interface may be predicted, and the second sub-interface may be a sub-interface with the smallest predicted bandwidth usage in the second interface. Alternatively, when the bandwidth usage parameter is the remaining idle bandwidth, a remaining idle bandwidth of each sub-interface of the second interface may be predicted, and the second sub-interface may be a sub-interface with largest predicted remaining idle bandwidth in the second interface.

The controller may store a correspondence among the device identifiers of the vBNG-UP network elements, the interface identifiers of the interfaces, and the interface identifiers of the sub-interfaces. Any record in the correspondence includes a device identifier of a vBNG-UP network element, an interface identifier of an interface on the vBNG-UP network element, and an interface identifier of each sub-interface on the interface. For example, Table 1 describes the correspondence among the device identifiers of the vBNG-UP network elements, the interface identifiers of the interfaces, and the interface identifiers of the sub-interfaces. A record in the second row in Table 1 includes the device identifier UP network element 1 of the vBNG-UP network element 1, the interface identifier F1 of the interface 1 of the vBNG-UP network element 1, and the interface identifiers of 50 sub-interfaces of the interface 1, where the interface identifiers of the 50 sub-interfaces are F1-1, F1-2, ..., and F1-50 respectively. Meanings of other records shown in Table 1 are the same as the meaning of the record in the second row. Details are not described herein again.

TABLE 1

| Device identifier of a vBNG-UP network element | Interface identifier of an interface | Interface identifiers of sub-interfaces |
| --- | --- | --- |
| UP network element 1 | F1 | F1-1, F1-2, F1-3, ..., F1-50 |
| UP network element 1 | F2 | F2-1, F2-2, F2-3, ..., F2-60 |
| ... | ... | ... |

For all the sub-interfaces of the first interface, the controller may obtain, based on the device identifier of the first vBNG-UP network element and the interface identifier of the first interface, the interface identifiers of the sub-interfaces of the first interface from the correspondence among the device identifiers of the vBNG-UP network elements, the interface identifiers of the interfaces, and the interface identifiers of the sub-interfaces. The controller selects, from the sub-interfaces corresponding to the obtained interface identifiers, a sub-interface as the first sub-interface. For all the sub-interfaces of the second interface, the controller may obtain, based on the device identifier of the second vBNG-UP network element and the interface identifier of the second interface, the interface identifiers of the sub-interfaces of the second interface from the correspondence among the device identifiers of the vBNG-UP network elements, the interface identifiers of the interfaces, and the interface identifiers of the sub-interfaces. The controller selects a sub-interface from the sub-interfaces corresponding to the obtained interface identifiers, and then predicts a bandwidth usage parameter value of the sub-interface.

Optionally, when the vBNG-CP network element is used to migrate network traffic, an embodiment of this application may not include step 204. In other words, after step 203 is performed, the vBNG-UP network element may directly perform a related operation in step 205.

Step 205: The vBNG-CP network element receives the first migration request message, and migrates the network traffic of the terminal devices on the first interface on the first vBNG-UP network element to the second interface on the second vBNG-UP network element based on the first migration request message.

In this step, the first migration request message includes the device identifier of the first vBNG-UP network element, the interface identifier of the first interface, the device identifier of the second vBNG-UP network element, and the interface identifier of the second interface. The vBNG-CP network element receives the first migration request message, and migrates the network traffic through the following operations 2051 to 2053. Alternatively, the controller is integrated into the vBNG-CP network element, that is, there is no controller in the foregoing network architecture. The vBNG-CP network element may obtain the device identifier of the first vBNG-UP network element, the interface identifier of the first interface, the device identifier of the second vBNG-UP network element, and the device identifier of the second interface in the manner in step 203, and migrate the network traffic through the following operations 2051 to 2053.

Optionally, the operations 2051 to 2053 are described as follows.

2051: The vBNG-CP network element obtains device information of the terminal devices in the first device group and an address segment of the first interface based on the device identifier of the first vBNG-UP network element and the interface identifier of the first interface.

The device information of the terminal devices includes addresses of the terminal devices, and may further include at least one piece of information such as related policy information or quality of service (QoS). The address of the terminal device may include at least one of an Internet Protocol (IP) address or a media access control (MAC) layer address of a user.

The vBNG-CP network element stores a correspondence among the device identifiers of the vBNG-UP network elements, the interface identifiers, and the device information of the terminal devices. A record that includes the device identifier of the first vBNG-UP network element and the interface identifier of the first interface in the correspondence stores the device information of the terminal devices that access the first vBNG-UP network element through the first interface. Therefore, the vBNG-CP network element may obtain, from the correspondence and based on the device identifier of the first vBNG-UP network element and the interface identifier of the first interface, the device information of the terminal devices that access the first vBNG-UP network element through the first interface, that is, the device information of the terminal devices in the first device group.

The vBNG-CP network element stores a correspondence among the device identifiers of the vBNG-UP network elements, the interface identifiers, and address segments. A record that includes the device identifier of the first vBNG-UP network element and the interface identifier of the first interface in the correspondence stores the address segment of the first interface. Therefore, the vBNG-CP network element may obtain the address segment of the first interface from the correspondence based on the device identifier of the first vBNG-UP network element and the interface identifier of the first interface.

For example, the first migration request message received by the vBNG-CP network element includes the device identifier UP network element 1 and the interface identifier F1 of the interface 1 of the vBNG-UP network element 1, and the device identifier UP network element 2 and the identifier F2 of the interface 2 of the vBNG-UP network element 2. Based on the device identifier UP network element 1 and the interface identifier F1 of the interface 1 of the vBNG-UP network element 1, the device information of the terminal device 1 and the device information of the terminal device 2 in the first device group are obtained from the correspondence that is among the device identifiers of the vBNG-UP network elements, the interface identifiers, and the device information and that is shown in the following Table 2. The device information of the terminal device 1 includes an address 10.1.1.0 of the terminal device 1, and the device information of the terminal device 2 includes an address 10.1.1.1 of the terminal device 2.

TABLE 2

| Device identifier of a vBNG-UP network element | Interface identifier | Device information |
|---|---|---|
| UP network element 1 | F1 | Address 10.1.1.0 of the terminal device 1<br>Address 10.1.1.1 of the terminal device 2 |
| . . . | . . . | . . . |

The controller obtains, based on the device identifier UP network element 1 and the interface identifier F1 of the interface 1 of the vBNG-UP network element 1, an address segment 10.1.1.0 to 10.1.1.24 of the interface 1 from the correspondence among the device identifiers of the vBNG-UP network elements, the interface identifiers, and the address segments that is shown in the following Table 3.

TABLE 3

| Device identifier of a vBNG-UP network element | Interface identifier | Address segment |
|---|---|---|
| UP network element 1 | F1 | 10.1.1.0 to 10.1.1.24 |
| . . . | . . . | . . . |

Optionally, when the first migration request message includes the device identifier of the first vBNG-UP network element, the interface identifier of the first sub-interface, the device identifier of the second vBNG-UP network element, and the interface identifier of the second sub-interface, the device information of the terminal devices in the first device group is obtained based on the device identifier of the first vBNG-UP network element and the interface identifier of the first sub-interface.

The vBNG-CP network element stores a correspondence among the device identifiers of the vBNG-UP network elements, the interface identifiers, and the device information of the terminal devices. A record that includes the device identifier of the first vBNG-UP network element and the interface identifier of the first sub-interface exists in the correspondence, and the record stores the device information of the terminal devices that access the first vBNG-UP network element through the first sub-interface. Therefore, the vBNG-CP network element may obtain, from the correspondence and based on the device identifier of the first vBNG-UP network element and the interface identifier of the first sub-interface, the device information of the terminal devices that access the first vBNG-UP network element through the first sub-interface, that is, the device information of the terminal devices in the first device group.

A record that includes the device identifier of the first vBNG-UP network element and the interface identifier of the first sub-interface exists in the correspondence among the device identifiers of the vBNG-UP network elements, the interface identifiers, and the address segments that is stored by the vBNG-CP network element, and the record stores an address segment of the first sub-interface. Therefore, the vBNG-CP network element may obtain the address segment of the first sub-interface from the correspondence based on the device identifier of the first vBNG-UP network element and the interface identifier of the first sub-interface.

2052: The vBNG-CP network element sends a second migration request message to the second vBNG-UP network element based on the device identifier of the second vBNG-UP network element, where the second migration request message includes the interface identifier of the second interface, the address segment of the first interface, and the device information of the terminal devices in the first device group.

For example, the vBNG-CP network element sends the second migration request message to the vBNG-UP network element 1 based on the device identifier UP network element 1 of the vBNG-UP network element 1. The second migration request message includes the identifier F2 of the interface 2, the address segment "10.1.1.0 to 10.1.1.24" of the interface 1, the device information of the terminal device 1, and the device information of the terminal device 2.

Optionally, when the first migration request message includes the device identifier of the first vBNG-UP network element, the interface identifier of the first sub-interface, the device identifier of the second vBNG-UP network element, and the interface identifier of the second sub-interface, the vBNG-CP network element sends the second migration request message to the second vBNG-UP network element based on the device identifier of the second vBNG-UP network element. The second migration request message includes the interface identifier of the second sub-interface, the address segment of the first sub-interface, and the device information of the terminal devices in the first device group.

2053: The second vBNG-UP network element receives the second migration request message, and migrates the network traffic of the terminal devices in the first device group to the second interface based on the interface identifier of the second interface, the address segment of the first interface, and the device information of the terminal devices in the first device group that are included in the second migration request message.

The second vBNG-UP network element determines the second interface based on the interface identifier of the second interface, and allocates the address segment of the first interface to the second interface, a current address segment of the second interface includes an original address segment of the second interface and the allocated address segment of the first interface. The second vBNG-UP network element sends the device identifier of the second vBNG-UP network element to each terminal device based on the device identifiers of the terminal devices in the first device group, and sends routing information to the CR, where the routing information includes the address segment of the first interface and the device identifier of the second vBNG-UP network element. The CR receives the routing information, and updates existing routing information including the address segment of the first interface to the received routing information.

When the second migration request message includes the interface identifier of the second sub-interface, the address segment of the first sub-interface, and the device information of the terminal devices in the first device group, the second vBNG-UP network element allocates the address segment of the first sub-interface to the second sub-interface based on the interface identifier of the second sub-interface, and a current address segment of the second sub-interface includes an original address segment of the second sub-interface and the allocated address segment of the first sub-interface. The second vBNG-UP network element sends the device identifier of the second vBNG-UP network element to each terminal device based on the device identifier of the terminal devices in the first device group, and sends routing information to the CR, where the routing information includes the address segment of the first sub-interface and the device identifier of the second vBNG-UP network element. The CR receives the routing information, and updates existing routing information including the address segment of the first sub-interface by the received routing information.

In this way, the terminal devices in the first device group send uplink network traffic to the second vBNG-UP network element based on the device identifier of the second vBNG-UP network element. Then, the second vBNG-UP network element sends the uplink network traffic to the CR. In addition, when the CR has downlink network traffic to be sent to a terminal device in the first device group, the CR determines, based on an address of the terminal device included in the downlink network traffic, an address segment to which the address belongs, obtains routing information including the address segment, and sends the downlink network traffic to the second vBNG-UP network element based on the device identifier of the second vBNG-UP network element included in the routing information. Then, the second vBNG-UP network element forwards the downlink network traffic to the terminal device.

Figure 4:
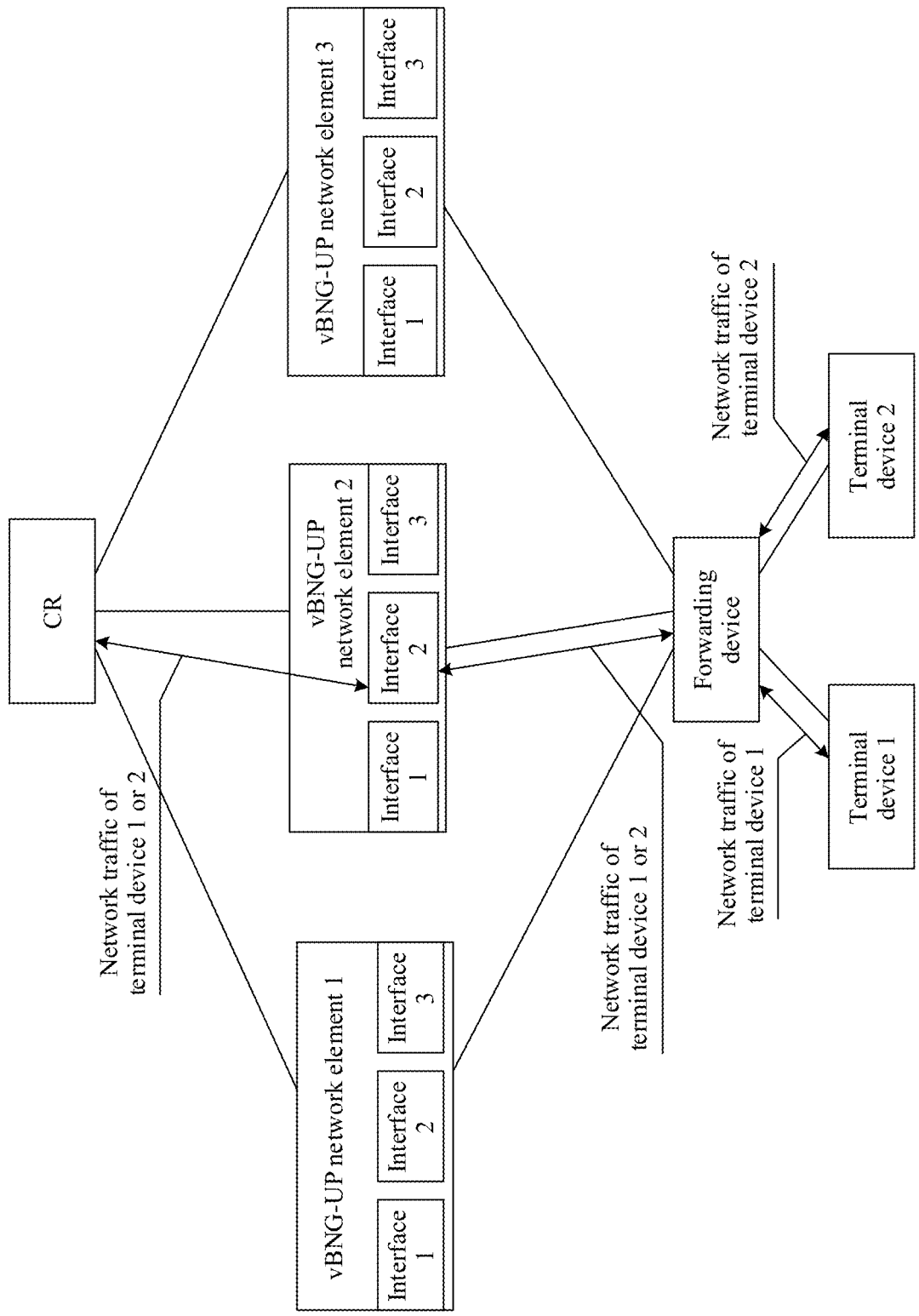
FIG. 4 is a schematic diagram of paths in which network traffic of terminal devices in a first device group is transmitted after the network traffic is migrated according to an embodiment of this application.

For example, the second migration request message received by the vBNG-UP network element 1 includes the identifier F2 of the interface 2, the address segment "10.1.1.0 to 10.1.1.24" of the interface 1, the device information of the terminal device 1, and the device information of the terminal device 2. The address segment of the interface 1 is allocated to the interface 2. If an original address segment of the interface 2 is 10.1.1.25 to 10.1.1.30, a current address segment of the interface 2 includes the original address segment of the interface 2 and the allocated address segment of the interface 1. The device identifier UP network element 2 of the vBNG-UP network element 2 is sent to the terminal device 1 based on the device identifier 10.1.1.0 of the terminal device 1, and routing information is sent to the CR, where the routing information includes the address segment "10.1.1.25 to 10.1.1.30" and the device identifier UP network element 2 of the vBNG-UP network element 21. The CR receives the routing information, and updates existing routing information including the address segment "10.1.1.25 to 10.1.1.30" to the received routing information. In this way, the network traffic of the terminal device 1 and the network traffic of the terminal device 2 are migrated to the interface 2 of the vBNG-UP network element 2, as shown in FIG. 4.

Optionally, in step 204, the controller selects one sub-interface from the sub-interfaces of the second interface as the second sub-interface. In this way, in this step, after the network traffic of the terminal devices in the first device group is migrated to the second sub-interface, when a sum of bandwidths occupied by network traffic of the terminal devices on the second sub-interface reaches or approaches a total bandwidth corresponding to the second sub-interface, the second vBNG-UP network element may reduce a bandwidth of another sub-interface on the second interface, and allocate the reduced bandwidth to the second sub-interface, so as to ensure that a bandwidth usage parameter value of the second sub-interface reaches the second threshold. That is, bandwidth usage of the second sub-interface is less than the second threshold, or a remaining idle bandwidth of the second sub-interface is greater than the second threshold.

Before the network traffic of the terminal devices on the first interface is migrated to the second interface on the second vBNG-UP network element, the network traffic of the terminal devices is transmitted through the first interface on the first vBNG-UP network element, as shown in FIG. 3. After the network traffic of the terminal devices on the first interface is migrated to the second interface on the second vBNG-UP network element, the network traffic of the terminal devices is transmitted through the second interface on the second vBNG-UP network element, as shown in FIG. 4. In this way, an amount of network traffic transmitted on the first vBNG-UP network element is reduced, thereby reducing bandwidth usage of the first vBNG-UP network element. This avoids problems such as traffic congestion that occurs on the first vBNG-UP network element when a total consumed bandwidth of the first vBNG-UP network element approaches or reaches the total bandwidth of the first vBNG-UP network element.

Optionally, after migrating the network traffic of the terminal devices in the first device group to the second interface on the second vBNG-UP network element, the vBNG-CP network element further sends the device information of the terminal devices in the first device group to the controller.

When the network traffic of the terminal devices in the first device group is all network traffic transmitted on the first interface, the controller stores, in a migration list, a correspondence among the device identifier of the first vBNG-UP network element, the interface identifier of the first interface, the device identifier of the second vBNG-UP network element, the interface identifier of the second interface, and the device information of the terminal devices in the first device group. When the network traffic of the terminal devices in the first device group is network traffic transmitted on the first sub-interface, the controller stores, in the migration list, a correspondence among the device identifier of the first vBNG-UP network element, the interface identifier of the first interface, the interface identifier of the first sub-interface, the device identifier of the second vBNG-UP network element, the interface identifier of the second interface, and the device information of the terminal devices in the first device group.

Optionally, when the controller is integrated into the vBNG-CP network element, that is, there is no controller in the network architecture, the vBNG-CP network element stores the migration list.

After the network traffic of the terminal devices in the first device group on the first interface on the first vBNG-UP network element is migrated to the second interface on the second vBNG-UP network element, the first vBNG-UP network element still periodically or aperiodically obtains a bandwidth usage parameter value of each interface on the first vBNG-UP network element, and sends an interface identifier and the bandwidth usage parameter value of each interface on the first vBNG-UP network element to the controller. In addition, the second vBNG-UP network element still periodically or aperiodically obtains a bandwidth usage parameter value of each interface on the second vBNG-UP network element, and sends an interface identifier and the bandwidth usage parameter value of each interface on the second vBNG-UP network element to the controller.

When the network traffic of the terminal devices in the first device group is network traffic transmitted on the first sub-interface, the controller receives the interface identifier and the bandwidth usage parameter value that are of each interface on the first vBNG-UP network element and that are sent by the first vBNG-UP network element. If the bandwidth usage parameter value of the first interface still reaches the first threshold, the controller continues to select a sub-interface from other sub-interfaces of the first interface except the first sub-interface. Then, operations in steps 203 and 205 are performed again to migrate network traffic on a device group on the sub-interface to a sub-interface on another vBNG-UP network element.

Optionally, the controller may migrate network traffic on a plurality of interfaces on one vBNG-UP network element to one interface on the same vBNG-UP network element. Alternatively, the controller may migrate network traffic on interfaces on a plurality of different vBNG-UP network elements to one interface on a same vBNG-UP network element. That is, network traffic of a plurality of device groups is migrated to one interface on the vBNG-UP network element. The vBNG-UP network element may periodically or aperiodically send a sum of bandwidths occupied by network traffic of terminal devices in any device group to the controller.

Optionally, the controller may migrate network traffic on a plurality of sub-interfaces on one vBNG-UP network element to one sub-interface on the same vBNG-UP network element. Alternatively, the controller may migrate network traffic on sub-interfaces on a plurality of different vBNG-UP network elements to one sub-interface on a same vBNG-UP network element.

Optionally, after the network traffic of the terminal devices on the first interface on the first vBNG-UP network element is migrated to the second interface on the second vBNG-UP network element, network traffic on the first interface on the first vBNG-UP network element may decrease with time. When finding that a bandwidth usage parameter value of the first interface on the first vBNG-UP network element reaches a third threshold, the controller may migrate the network traffic of the first device group on the second vBNG-UP network element back to the first interface on the first vBNG-UP network element.

When the bandwidth usage parameter value is the bandwidth usage, that the bandwidth usage parameter value of the first interface reaches the third threshold means that the bandwidth usage of the first interface is less than the third threshold. In this case, the third threshold is less than the first threshold.

When the bandwidth usage parameter value is the remaining idle bandwidth, that the bandwidth usage parameter value of the first interface reaches the third threshold means that the remaining idle bandwidth of the first interface is greater than the third threshold. In this case, the third threshold is greater than the first threshold.

Optionally, a process of migrating back the network traffic is as follows.

Step 206: When detecting that the bandwidth usage parameter value of the first interface on the first vBNG-UP network element reaches the third threshold, the controller predicts a bandwidth usage parameter value of the first interface after the network traffic of the terminal devices in the first device group is migrated back to the first interface.

Optionally, after receiving the interface identifier and the bandwidth usage parameter value that are of each interface on the first vBNG-UP network element and that are sent by the first vBNG-UP network element, the controller finds, from the migration list, a correspondence between the device identifier of the first vBNG-UP network element and the interface identifier of any interface that is of the first vBNG-UP network element and of which the bandwidth usage parameter value reaches the third threshold. The record indicates that network traffic has been migrated from the interface. In addition, the record further includes the device identifier of the second vBNG-UP network element to which network traffic has been migrated, the interface identifier of the second interface to which network traffic has been migrated, and the device information of the terminal devices in the first device group. Alternatively, the record further includes the interface identifier of the first sub-interface from which the network traffic has been migrated, the device identifier of the second vBNG-UP network element to which network traffic has been migrated, the interface identifier of the second sub-interface to which network traffic has been migrated, and the device information of the terminal devices in the first device group. Then, the prediction operation in this step starts to be performed.

In this step, the prediction operation may be implemented through the following operations 2061 to 2063.

2061: Obtains a current occupied bandwidth of the first interface on the first vBNG-UP network element and the total bandwidth corresponding to the first interface.

The controller may obtain, based on the device identifier and the interface identifier of the first interface of the first vBNG-UP network element, the total bandwidth of the first interface from the correspondence among the device identifiers of the vBNG-UP network elements, the interface identifiers, and the total bandwidths, and obtains the occupied bandwidth of the first interface based on the bandwidth usage parameter value of the first interface and the total bandwidth of the first interface.

2062: Obtains a sum of bandwidths currently occupied by the terminal devices in the first device group on the second vBNG-UP network element.

After the network traffic of the terminal devices in the first device group is migrated to the second interface on the second vBNG-UP network element, the second vBNG-UP network element periodically or aperiodically collects statistics about a sum of bandwidths occupied by the network traffic of the terminal devices in the first device group, and sends the sum of bandwidths to the controller. Therefore, in this step, the controller may receive the sum of bandwidths currently occupied by the terminal devices in the first device group.

There is no execution sequence between the foregoing two operations 2061 and 2062. 2061 may be executed before 2062, or 2062 may be executed before 2061, or 2061 and 2062 may be executed simultaneously.

2063: Predicts the bandwidth usage parameter value of the first interface after the network traffic of the terminal devices in the first device group is migrated back to the first interface based on the occupied bandwidth of the first interface, the total bandwidth of the first interface, and the sum of bandwidths.

Step 207: When the predicted bandwidth usage parameter value reaches a fourth threshold, the controller sends a reverse migration request message to the vBNG-CP network element, where the reverse migration request message includes the device identifier of the first vBNG-UP network element, the interface identifier of the first interface, the device identifier of the second vBNG-UP network element, the interface identifier of the second interface, and the device information of the terminal devices in the first device group.

Optionally, the fourth threshold may be equal to the second threshold. When the bandwidth usage parameter is the bandwidth usage, the fourth threshold may be less than or equal to the second threshold. When the bandwidth usage parameter is the remaining idle bandwidth, the fourth threshold is greater than or equal to the second threshold.

Optionally, when the network traffic of the terminal devices in the first device group is network traffic transmitted on the first sub-interface on the first vBNG-UP network element, the reverse migration request message includes the device identifier of the first vBNG-UP network element, the interface identifier of the first sub-interface, the device identifier of the second vBNG-UP network element, the interface identifier of the second sub-interface, and the device information of the terminal devices in the first device group.

When the controller is integrated into the vBNG-CP network element, the vBNG-CP network element directly performs a related operation of migrating back the network traffic in the following step 208 when the predicted bandwidth usage parameter value reaches the second threshold.

Step 208: The vBNG-CP network element receives the reverse migration request message, and migrates the network traffic of the terminal devices in the first device group to the first interface on the first vBNG-UP network element based on the reverse migration request message.

Optionally, after receiving the reverse migration request message, the vBNG-CP network element may migrate back the network traffic through the following operations 2081 to 2082.

2081: The vBNG-CP network element sends a reverse migration instruction to the first vBNG-UP network element based on the device identifier of the first vBNG-UP network element, where the reverse migration instruction includes the interface identifier of the first interface and the device information of the terminal devices in the first device group.

Optionally, when the reverse migration request message includes the interface identifier of the first sub-interface, the reverse migration instruction includes the interface identifier of the first sub-interface and the device information of the terminal devices in the first device group.

2082: The first vBNG-UP network element receives the reverse migration instruction, and migrates the network traffic of the terminal devices in the first device group to the first interface based on the interface identifier of the first interface and the device information of the terminal devices in the first device group that are included in the reverse migration instruction.

The first vBNG-UP network element determines the first interface based on the interface identifier of the first interface, sends the device identifier of the first vBNG-UP network element to each terminal device based on the device identifier of the terminal devices in the first device group, and sends routing information to the CR, where the routing information includes the address segment of the first interface and the device identifier of the first vBNG-UP network element. The CR receives the routing information, and updates existing routing information including the address segment of the first interface to the received routing information.

Alternatively, when the reverse migration instruction includes the interface identifier of the second sub-interface and the device information of the terminal devices in the first device group, the first vBNG-UP network element determines the first sub-interface based on the interface identifier of the first sub-interface, sends the device identifier of the first vBNG-UP network element to each terminal device based on the device identifier of the terminal devices in the first device group, and sends routing information to the CR, where the routing information includes the address segment of the first sub-interface and the device identifier of the first vBNG-UP network element. The CR receives the routing information, and updates existing routing information including the address segment of the first sub-interface to the received routing information.

In this way, the terminal devices in the first device group send uplink network traffic to the first vBNG-UP network element based on the device identifier of the first vBNG-UP network element. Then, the first vBNG-UP network element sends the uplink network traffic to the CR. In addition, when the CR has downlink network traffic to be sent to a terminal device in the first device group, the CR determines, based on an address of the terminal device included in the downlink network traffic, an address segment to which the address belongs, obtains routing information including the address segment, and sends the downlink network traffic to the first vBNG-UP network element based on the device identifier of the first vBNG-UP network element included in the routing information. Then, the first vBNG-UP network element forwards the downlink network traffic to the terminal device.

Optionally, the vBNG-CP network element obtains, based on the device identifier of the second vBNG-UP network element and the interface identifier of the first interface, the address segment of the first interface from the correspondence among the device identifiers of the vBNG-UP network elements, the interface identifiers, and the address segments, and sends a deletion instruction to the vBNG-UP network element based on the device identifier of the second vBNG-UP network element, where the deletion instruction includes the interface identifier of the second interface and the address segment. The second vBNG-UP network element obtains the address segment of the second interface based on the interface identifier of the second interface, and deletes the address segment in the deletion instruction from the address segment of the second interface.

Alternatively, the vBNG-CP network element obtains, based on the device identifier of the second vBNG-UP network element and the interface identifier of the first sub-interface, the address segment of the first sub-interface from the correspondence among the device identifiers of the vBNG-UP network elements, the interface identifiers, and the address segments, and sends a deletion instruction to the vBNG-UP network element based on the device identifier of the second vBNG-UP network element, where the deletion instruction includes the interface identifier of the second sub-interface and the address segment. The second vBNG-UP network element obtains the address segment of the second sub-interface based on the interface identifier of the second sub-interface, and deletes the address segment in the deletion instruction from the address segment of the second sub-interface.

In some embodiments of this application, any one of the M vBNG-UP network elements sends the interface identifier and the bandwidth usage parameter value of each interface on the vBNG-UP network element to the controller. The controller may determine the first interface of which the bandwidth usage parameter value reaches the first threshold and the first vBNG-UP network element on which the first interface is located, and determine the to-be-migrated first device group on the first interface. The controller determines, based on the sum of bandwidths occupied by the network traffic of the terminal devices in the first device group and the bandwidth usage parameter value of the interfaces on each vBNG-UP network element, the second interface of which the bandwidth usage parameter value reaches the second threshold and the second vBNG-UP network element on which the second interface is located, and migrates the network traffic of the terminal devices in the first device group to the second interface on the second vBNG-UP network element. Because the controller migrates the network traffic on the first interface to the second interface on the second vBNG-UP network element, an amount of network traffic on the first interface on the first vBNG-UP network element can be reduced, and the bandwidth usage of the first interface on the first vBNG-UP network element can be reduced, avoiding a problem such as traffic congestion on the first vBNG-UP network element.

Figure 5A:
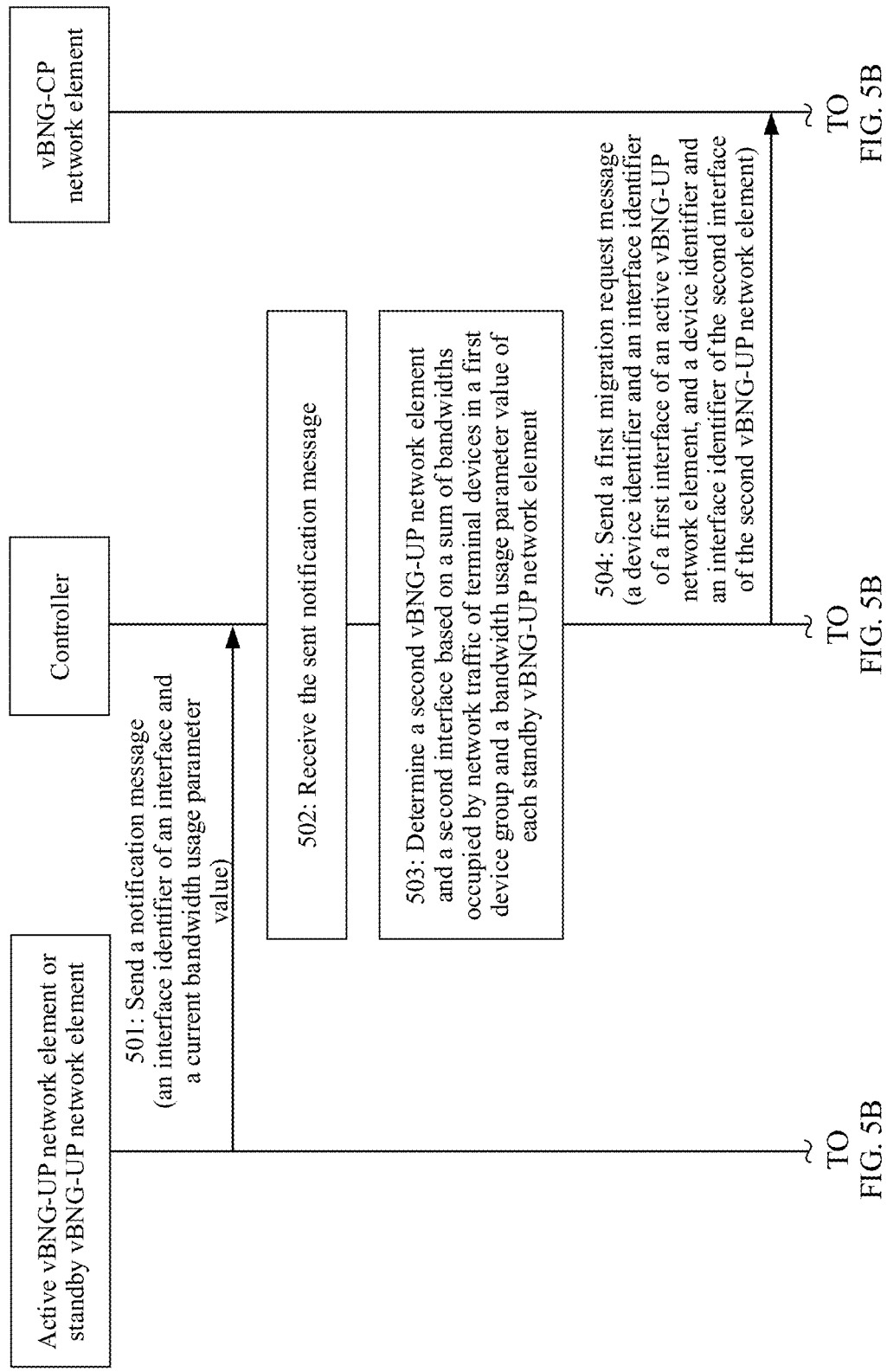
FIG. 5A and FIG. 5B show a flowchart of another network traffic migration method according to an embodiment of this application.
Figure 5B:
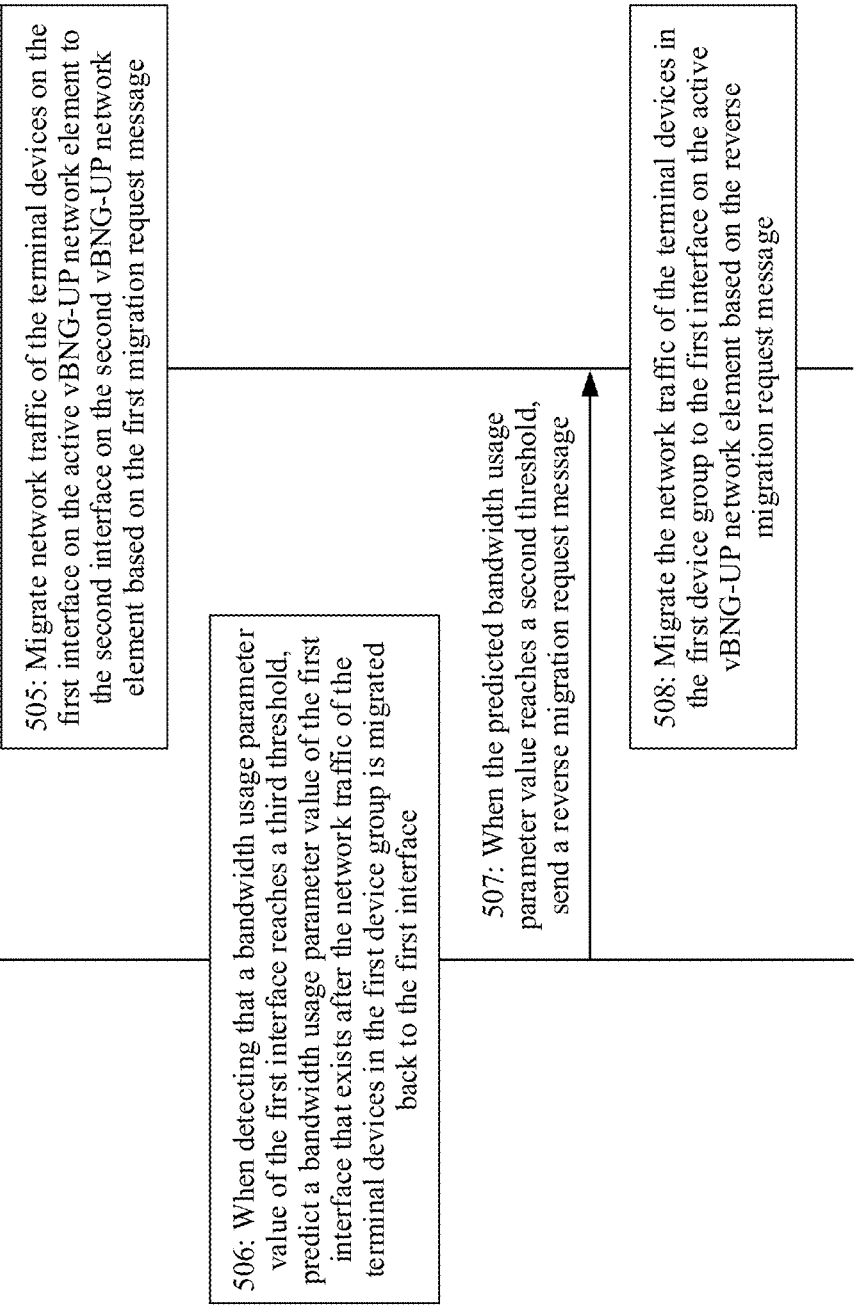

FIG. 5A and FIG. 5B show a network traffic migration method provided in an embodiment of this application. The method may be applied to the network architecture shown in FIG. 1. In the method, the controller or the vBNG-CP network element may migrate network traffic transmitted on an active vBNG-UP network element to a standby vBNG-UP network element corresponding to the active vBNG-UP network element, so as to avoid the problem that a total consumed bandwidth of the active vBNG-UP network element reaches or approaches a total bandwidth corresponding to the active vBNG-UP network element. The method includes the following steps.

Step 501: A vBNG-UP network element obtains a current bandwidth usage parameter value of each interface on the vBNG-UP network element, and sends a notification message to the controller, where the notification message includes an interface identifier and the current bandwidth usage parameter value of each interface on the vBNG-UP network element.

In some embodiments of this application, an example in which the controller migrates the network traffic is described. If the vBNG-CP network element is used to migrate the network traffic, the controller is integrated into the vBNG-CP network element. For a solution in which the vBNG-CP network element migrates the network traffic, the network architecture may not contain a controller, but contain the vBNG-CP network element instead of the controller.

The vBNG-UP network element may be the active vBNG-UP network element or any standby vBNG-UP network element in a backup group of the active vBNG-UP network element.

For a detailed implementation process in which the vBNG-UP network element sends the notification message to the controller, refer to related content in step 201 in the embodiment shown in FIG. 2A and FIG. 2B. Details are not described herein again.

Step 502: The controller receives the notification message sent by the vBNG-UP network element, where the notification message includes the interface identifier and the bandwidth usage parameter value of each interface on the vBNG-UP network element.

The controller may receive the interface identifier and the bandwidth usage parameter value that are of each interface on the active vBNG-UP network element and that are sent by the active vBNG-UP network element. In addition, the controller receives the interface identifier and the bandwidth usage parameter value that are of each interface on the standby vBNG-UP network element and that are sent by the standby vBNG-UP network element. In this way, the controller obtains the interface identifier and the bandwidth usage parameter value of each interface on the active vBNG-UP network element, and the interface identifier and the bandwidth usage parameter value of each interface on each standby vBNG-UP network element corresponding to the active vBNG-UP network element.

Step 503: When a bandwidth usage parameter value of a first interface on the active vBNG-UP network element reaches a first threshold, the controller determines a second vBNG-UP network element and a second interface on the vBNG-UP network element based on a sum of bandwidths occupied by to-be-migrated network traffic of terminal devices in a first device group on the active vBNG-UP network element and a bandwidth usage parameter value of each standby vBNG-UP network element in the backup group corresponding to the active vBNG-UP network element.

Optionally, the to-be-migrated network traffic of the terminal devices in the first device group is network traffic transmitted on the first interface. Optionally, the network traffic of the terminal devices in the first device group is all network traffic transmitted on the first interface, or the network traffic of the terminal devices in the first device group is network traffic transmitted on a first sub-interface. The first sub-interface is a sub-interface of the first interface.

The second vBNG-UP network element is a standby vBNG-UP network element, and the second interface is a standby interface that is corresponding to the first interface and that is on the second vBNG-UP network element.

Optionally, when the first interface is a network-side interface, the network traffic of the terminal devices in the first device group is network traffic transmitted on a user-side interface corresponding to the network-side interface, and the second interface is also a user-side interface.

Optionally, when the bandwidth usage parameter is the bandwidth usage, the first interface is an interface that is included in the active vBNG-UP network element and of which the bandwidth usage parameter exceeds the first threshold.

Optionally, when the bandwidth usage parameter is the remaining idle bandwidth, the first interface is an interface that is included in the active vBNG-UP network element and of which the remaining idle bandwidth is less than the first threshold.

This step may be implemented through the following operations 5031 to 5033.

5031: The controller obtains the sum of bandwidths occupied by the network traffic of the terminal devices in the first device group.

When the network traffic of the terminal devices in the first device group is all network traffic transmitted on the first interface, the controller obtains, based on a device identifier of the active vBNG-UP network element and an interface identifier of the first interface, a total bandwidth corresponding to the first interface, and obtains, based on the bandwidth usage parameter value of the first interface and the total bandwidth corresponding to the first interface, the sum of bandwidths occupied by the network traffic of the terminal devices in the first device group. Alternatively, when a notification message sent by the active vBNG-UP network element further includes an occupied bandwidth of the first interface, the occupied bandwidth of the first interface is used as the sum of bandwidths occupied by the network traffic of the terminal devices in the first device group.

When the network traffic of the terminal devices in the first device group is network traffic transmitted on the first sub-interface on the first interface, the controller obtains, based on the device identifier of the active vBNG-UP network element and an interface identifier of the first sub-interface, a total bandwidth corresponding to the first sub-interface, and obtains, based on a bandwidth usage parameter value of the first sub-interface and the total bandwidth corresponding to the first sub-interface, the sum of bandwidths occupied by the network traffic of the terminal devices in the first device group. Alternatively, when the notification message sent by the active vBNG-UP network element further includes an occupied bandwidth of the first sub-interface, the occupied bandwidth of the first sub-interface is used as the sum of bandwidths occupied by the network traffic of the terminal devices in the first device group.

5032: The controller predicts a bandwidth usage parameter value of a target interface after the network traffic of the terminal devices in the first device group is migrated to the target interface, where the target interface is any standby interface corresponding to the first interface, and the vBNG-UP network element on which the standby interface is located is a standby vBNG-UP network element corresponding to the active vBNG-UP network element.

The controller may store a correspondence among the device identifier of the active vBNG-UP network element, the interface identifier of the active interface, device identifiers of standby vBNG-UP network elements, and interface identifiers of standby interfaces. The controller obtains, from the correspondence and based on the device identifier of the active vBNG-UP network element and the interface identifier of the first interface (the first interface is the active interface), an interface identifier of a standby interface that is on each standby vBNG-UP network element corresponding to the active vBNG-UP network element and that corresponds to the first interface, to obtain each standby interface corresponding to the first interface, and one or more standby vBNG-UP network elements included in the backup group of the active vBNG-UP network element.

The controller may select one standby vBNG-UP network element from the standby vBNG-UP network elements included in the backup group of the active vBNG-UP network element. When the network traffic of the terminal devices in the first device group is all network traffic transmitted on the first interface, a standby interface that is on the standby vBNG-UP network element and that corresponds to the first interface is determined, and the standby interface is used as the target interface. Alternatively, when the network traffic of the terminal devices in the first device group is network traffic transmitted on the first sub-interface, a standby sub-interface that is on the standby vBNG-UP network element and that corresponds to the first sub-interface is determined, and the standby sub-interface is used as the target interface.

The controller obtains, based on the device identifier of the standby vBNG-UP network element and an interface identifier of the target interface, a total bandwidth corresponding to the target interface. The controller obtains, based on a bandwidth usage parameter value of the target interface and the total bandwidth corresponding to the target interface, an occupied bandwidth of the target interface. Alternatively, when the notification message sent by the standby vBNG-UP network element further includes the occupied bandwidth of the target interface, the controller obtains the occupied bandwidth of the target interface from the notification message. The controller obtains, based on the sum of bandwidths occupied by the network traffic of the terminal devices in the first device group and the occupied bandwidth of the target interface, a bandwidth usage parameter value of the target interface after the network traffic of the terminal devices in the first device group is migrated to the target interface.

The bandwidth usage parameter value of each standby interface corresponding to the first interface may be predicted in the foregoing manner.

5033: When the predicted bandwidth usage parameter value of the target interface reaches a second threshold, the controller selects the standby vBNG-UP network element on which the target interface is located as the second vBNG-UP network element, and uses the target interface as the second interface.

When the bandwidth usage parameter is the bandwidth usage, and the predicted bandwidth usage of the target interface is less than the second threshold, the controller determines the standby vBNG-UP network element on which the target interface is located as the second vBNG-UP network element, and uses the target interface as the second interface. In this case, the second threshold is less than or equal to the first threshold.

Optionally, the controller selects a standby interface with the smallest predicted bandwidth usage from the standby interfaces of the first interface as the second interface, where the smallest bandwidth usage is less than the second threshold, and uses the standby vBNG-UP network element on which the second interface is located as the second vBNG-UP network element. Alternatively, the controller selects a standby sub-interface with the smallest predicted bandwidth usage from the standby sub-interfaces of the first sub-interface as the second sub-interface, where the smallest bandwidth usage is less than the second threshold, and uses the standby vBNG-UP network element on which the second sub-interface is located as the second vBNG-UP network element.

When the bandwidth usage parameter is the remaining idle bandwidth, and the predicted remaining idle bandwidth of the target interface is greater than the second threshold, the controller determines the standby vBNG-UP network element on which the target interface is located as the second vBNG-UP network element, and uses the target interface as the second interface. In this case, the second threshold is greater than or equal to the first threshold.

Optionally, the controller selects a largest remaining idle bandwidth from predicted remaining idle bandwidths corresponding to the standby interfaces of the first interface. When the largest remaining idle bandwidth is greater than the second threshold, the controller uses a standby interface corresponding to the largest remaining idle bandwidth as the second interface, and uses the standby vBNG-UP network element on which the second interface is located as the second vBNG-UP network element. Alternatively, the controller selects a largest remaining idle bandwidth from predicted remaining idle bandwidths corresponding to the standby sub-interfaces of the first sub-interface. When the largest remaining idle bandwidth is greater than the second threshold, the controller uses a standby sub-interface corresponding to the largest remaining idle bandwidth as the second sub-interface, and uses the standby vBNG-UP network element on which the second sub-interface is located as the second vBNG-UP network element.

Optionally, a total bandwidth of each standby interface corresponding to the first interface may be greater than the total bandwidth of the first interface. A total bandwidth of each standby sub-interface corresponding to the first sub-interface may be greater than the total bandwidth of the first sub-interface.

Step 504: The controller sends a first migration request message to the vBNG-CP network element, where the first migration request message includes the device identifier of the active vBNG-UP network element, the interface identifier of the first interface, a device identifier of the second vBNG-UP network element, and an interface identifier of the second interface.

Optionally, when the network traffic of the terminal devices in the first device group is network traffic transmitted on the first sub-interface of the first interface, the first migration request message includes the device identifier of the first vBNG-UP network element, the interface identifier of the first sub-interface, the device identifier of the second vBNG-UP network element, and the interface identifier of the second sub-interface, and the second sub-interface is a sub-interface of the second interface and is also a standby sub-interface corresponding to the first sub-interface.

For example, as shown in FIG. 6, it is assumed that the active vBNG-UP network element corresponds to a standby vBNG-UP network element 1 and a standby vBNG-UP network element 2. The active vBNG-UP network element includes an interface 1, an interface 2, and an interface 3. The standby vBNG-UP network element 1 includes a standby interface 1, a standby interface 2, and a standby interface 3. The standby vBNG-UP network element 2 also includes a standby interface 1, a standby interface 2, and a standby interface 3. It is assumed that a bandwidth usage parameter value of the interface 1 of the active vBNG-UP network element 1 reaches the first threshold. It is predicted that a bandwidth usage parameter value of the standby interface 1 of the standby vBNG-UP network element 1 reaches a second threshold, and the standby interface 1 is a standby interface corresponding to the interface 1.

In this way, the controller may send a first migration request message to the vBNG-CP network element. The first migration request message includes a device identifier UP network element 1 and an interface identifier F1 of the interface 1 of the active vBNG-UP network element, and a device identifier UP network element 2 and an identifier F1 of the standby interface 1 of the standby vBNG-UP network element 1.

Optionally, when the vBNG-CP network element is used to migrate network traffic, an embodiment of this application may not include step 504. In other words, after step 503 is performed, the vBNG-UP network element may directly perform a related operation in step 505.

Step 505: The vBNG-CP network element receives the first migration request message, and migrates the network traffic of the terminal devices on the first interface on the active vBNG-UP network element to the second interface on the second vBNG-UP network element based on the first migration request message.

In this step, the first migration request message includes the device identifier of the active vBNG-UP network element, the interface identifier of the first interface, the device identifier of the second vBNG-UP network element, and the interface identifier of the second interface. The vBNG-CP network element receives the first migration request message, and migrates the network traffic through the following operations 5051 to 5053. Alternatively, the controller is integrated into the vBNG-CP network element, that is, there is no controller in the foregoing network architecture. The vBNG-CP network element may obtain the device identifier of the active vBNG-UP network element, the interface identifier of the first interface, the device identifier of the second vBNG-UP network element, and the device identifier of the second interface in the manner in step 503, and migrate the network traffic through the following operations 5051 to 5053.

Optionally, the operations 5051 to 5053 are described as follows.

5051: The vBNG-CP network element obtains device information of the terminal devices in the first device group based on the device identifier of the active vBNG-UP network element and the interface identifier of the first interface.

For example, the first migration request message received by the vBNG-CP network element includes the device identifier UP network element 1 and the interface identifier F1 of the interface 1 of the active vBNG-UP network element, and the device identifier UP network element 2 and the identifier F1 of the standby interface 1 of the standby vBNG-UP network element 1. Based on the device identifier UP network element 1 and the interface identifier F1 of the interface 1 of the active vBNG-UP network element 1, the device information of the terminal device 1 and the device information of the terminal device 2 in the first device group are obtained from the correspondence that is among the device identifiers of the vBNG-UP network elements, the interface identifiers, and the device information and that is shown in the foregoing Table 2. The device information of the terminal device 1 includes an address 10.1.1.0 of the terminal device 1, and the device information of the terminal device 2 includes an address 10.1.1.1 of the terminal device 2.

Optionally, when the first migration request message includes the device identifier and the interface identifier of the first sub-interface of the active vBNG-UP network element, and the device identifier and the interface identifier of the second sub-interface of the second vBNG-UP network element, the device information of the terminal devices in the first device group is obtained based on the device identifier of the active vBNG-UP network element and the interface identifier of the first sub-interface.

5052: The vBNG-CP network element sends a second migration request message to the second vBNG-UP network element based on the device identifier of the second vBNG-UP network element, where the second migration request message includes the interface identifier of the second interface and the device information of the terminal devices in the first device group.

For example, the vBNG-CP network element sends the second migration request message to the standby vBNG-UP network element 1 based on the device identifier UP network element 1 of the active vBNG-UP network element. The second migration request message includes the identifier F2 of the interface 2, the device information of the terminal device 1, and the device information of the terminal device 2.

Optionally, when the first migration request message includes the device identifier of the active vBNG-UP network element, the interface identifier of the first sub-interface, the device identifier of the second vBNG-UP network element, and the interface identifier of the second sub-interface, the vBNG-CP network element sends the second migration request message to the second vBNG-UP network element based on the device identifier of the second vBNG-UP network element. The second migration request message includes the interface identifier of the second sub-interface, the address segment of the first sub-interface, and the device information of the terminal devices in the first device group.

5053: The second vBNG-UP network element receives the second migration request message, and migrates the network traffic of the terminal devices in the first device group to the second interface based on the interface identifier of the second interface and the device information of the terminal devices in the first device group that are included in the second migration request message.

The second vBNG-UP network element: obtains at least one address segment of the second interface based on the interface identifier of the second interface, where the at least one address segment includes an address segment of the first interface; obtains the address segment of the first interface from the at least one address segment based on an address included in the device information of the terminal devices in the first device group; and sends the device identifier of the second vBNG-UP network element to each terminal device based on device identifiers of the terminal devices in the first device group, and sends a priority adjustment request to the CR, where the priority adjustment request includes the address segment of the first interface. The CR receives the priority adjustment request, and raises a priority of target routing information. The target routing information includes the address segment of the first interface and the device identifier of the second vBNG-UP network element. After the priority is raised, the priority of the target routing information is the highest in routing information including the address segment of the first interface.

When the second migration request message includes the interface identifier of the second sub-interface and the device information of the terminal devices in the first device group, the second vBNG-UP network element: obtains at least one address segment of the second sub-interface based on the interface identifier of the second sub-interface, where the at least one address segment includes an address segment of the first sub-interface; obtains the address segment of the first sub-interface from the at least one address segment based on an address included in the device information of the terminal devices in the first device group; and sends the device identifier of the second vBNG-UP network element to each terminal device based on the device identifier of the terminal devices in the first device group, and sends a priority adjustment request to the CR, where the priority adjustment request includes the address segment of the first sub-interface. The CR receives the priority adjustment request, and raises a priority of target routing information. The target routing information includes the address segment of the first interface and the device identifier of the second vBNG-UP network element. After the priority is raised, the priority of the target routing information is the highest in routing information including the address segment of the first sub-interface.

In this way, the terminal devices in the first device group send uplink network traffic to the second vBNG-UP network element based on the device identifier of the second vBNG-UP network element. Then, the second vBNG-UP network element sends the uplink network traffic to the CR. In addition, when the CR has downlink network traffic to be sent to a terminal device in the first device group, the CR determines, based on an address of the terminal device included in the downlink network traffic, an address segment to which the address belongs, obtains routing information including the address segment, and selects the target routing information with the highest priority from the obtained routing information. The CR sends the downlink network traffic to the second vBNG-UP network element based on the device identifier of the second vBNG-UP network element included in the target routing information. Then, the second vBNG-UP network element forwards the downlink network traffic to the terminal device.

Figure 7:
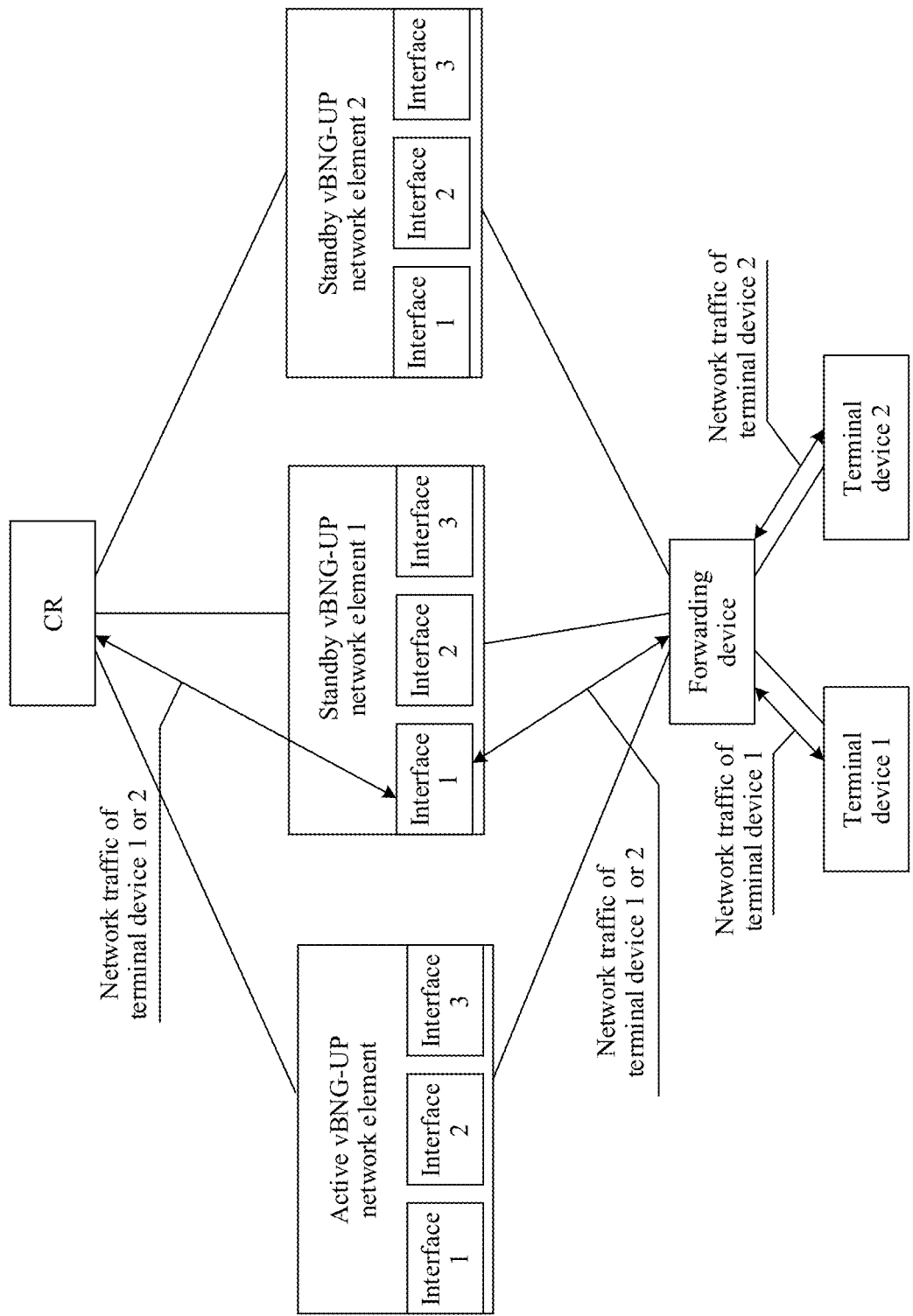
FIG. 7 is a schematic diagram of paths in which network traffic of terminal devices in a first device group is transmitted after the network traffic is migrated from an active vBNG-UP network element according to an embodiment of this application.

For example, the second migration request message received by the standby vBNG-UP network element 1 includes the identifier F1 of the interface 1, the device information of the terminal device 1, and the device information of the terminal device 2. At least one address segment of the interface 1 is determined based on the identifier F1 of the interface 1. Based on an address 10.1.1.0 included in the terminal device 1, the address segment including the address is obtained from the at least one address segment, where it is assumed that the address segment is 10.1.1.25 to 10.1.1.30. The device identifier UP network element 1 of the standby vBNG-UP network element 1 is sent to the terminal device 1 based on the device identifier 10.1.1.0 of the terminal device 1, and a priority adjustment request is sent to the CR, where the priority adjustment request includes the address segment "10.1.1.25 to 10.1.1.30". The CR receives the priority adjustment request, obtains target routing information including the address segment "10.1.1.25 to 10.1.1.30" and the device identifier UP network element 2 of the standby vBNG-UP network element 1, and raises a priority of the target routing information. In addition, the raised priority is the highest among priorities of the routing information including the address segment "10.1.1.25 to 10.1.1.30". In this way, the network traffic of the terminal device 1 and the network traffic of the terminal device 2 are migrated to the standby interface 1 of the standby vBNG-UP network element 1, as shown in FIG. 7.

Optionally, in step 504, the controller selects one sub-interface from the sub-interfaces of the second interface as the second sub-interface. In this way, in this step, after the network traffic of the terminal devices in the first device group is migrated to the second sub-interface, when a sum of bandwidths occupied by network traffic of the terminal devices on the second sub-interface reaches or approaches a total bandwidth corresponding to the second sub-interface, the second vBNG-UP network element may reduce a bandwidth of another sub-interface on the second interface, and allocate the reduced bandwidth to the second sub-interface, so as to ensure that a bandwidth usage parameter value of the second sub-interface reaches the second threshold. That is, bandwidth usage of the second sub-interface is less than the second threshold, or a remaining idle bandwidth of the second sub-interface is greater than the second threshold.

Optionally, after migrating the network traffic of the terminal devices in the first device group to the second interface on the second vBNG-UP network element, the vBNG-CP network element further sends the device information of the terminal devices in the first device group to the controller.

When the network traffic of the terminal devices in the first device group is all network traffic transmitted on the first interface, the controller stores, in a migration list, a correspondence among the device identifier of the active vBNG-UP network element, the interface identifier of the first interface, the device identifier of the active vBNG-UP network element, the interface identifier of the second interface, and the device information of the terminal devices in the first device group. When the network traffic of the terminal devices in the first device group is network traffic transmitted on the first sub-interface, the controller stores, in the migration list, a correspondence among the device identifier of the active vBNG-UP network element, the interface identifier of the first interface, the interface identifier of the first sub-interface, the device identifier of the active vBNG-UP network element, the interface identifier of the second interface, and the device information of the terminal devices in the first device group.

Optionally, when the controller is integrated into the vBNG-CP network element, that is, there is no controller in the network architecture, the vBNG-CP network element stores the migration list.

Optionally, the controller may migrate network traffic on interfaces on a plurality of active vBNG-UP network elements to one interface on a same standby vBNG-UP network element. That is, network traffic of a plurality of device groups is migrated to one interface on the standby vBNG-UP network element. The vBNG-UP network element may periodically or aperiodically send a sum of bandwidths occupied by network traffic of terminal devices in any device group to the controller.

Optionally, the controller may migrate network traffic on sub-interfaces on a plurality of different active vBNG-UP network elements to one standby sub-interface on a same standby vBNG-UP network element.

Optionally, after the network traffic of the terminal devices on the first interface on the active vBNG-UP network element is migrated to the second interface on the second vBNG-UP network element, network traffic on the first interface on the active vBNG-UP network element may decrease with time. When finding that a bandwidth usage parameter value of the first interface on the active vBNG-UP network element reaches a third threshold, the controller may migrate the network traffic of the first device group on the second vBNG-UP network element back to the first interface on the active vBNG-UP network element.

Step 506: When detecting that the bandwidth usage parameter value of the first interface on the active vBNG-UP network element reaches the third threshold, the controller predicts a bandwidth usage parameter value of the first interface after the network traffic of the terminal devices in the first device group is migrated back to the first interface.

For a detailed implementation process in which the controller detects the bandwidth usage parameter value of the first interface and predicts the bandwidth usage parameter value of the first interface, refer to related content in step 206. Details are not described herein again.

Step 507: When the predicted bandwidth usage parameter value reaches a fourth threshold, the controller sends a reverse migration request message to the vBNG-CP network element, where the reverse migration request message includes the device identifier of the active vBNG-UP network element, the interface identifier of the first interface, and the device information of the terminal devices in the first device group.

Optionally, when the network traffic of the terminal devices in the first device group is network traffic transmitted on the first sub-interface on the active vBNG-UP network element, the reverse migration request message includes the device identifier of the active vBNG-UP network element, the interface identifier of the first sub-interface, and the device information of the terminal devices in the first device group.

When the controller is integrated into the vBNG-CP network element, when the predicted bandwidth usage parameter value reaches the second threshold, the vBNG-CP network element directly performs a related operation of migrating back the network traffic in the following step 508.

Step 508: The vBNG-CP network element receives the reverse migration request message, and migrates the network traffic of the terminal devices in the first device group to the first interface on the active vBNG-UP network element based on the reverse migration request message.

Optionally, after receiving the reverse migration request message, the vBNG-CP network element may migrate back the network traffic through the following operations 5081 to 5082.

5081: The vBNG-CP network element sends a reverse migration instruction to the active vBNG-UP network element based on the device identifier of the active vBNG-UP network element, where the reverse migration instruction includes the interface identifier of the first interface and the device information of the terminal devices in the first device group.

Optionally, when the reverse migration request message includes the interface identifier of the first sub-interface, the reverse migration instruction includes the interface identifier of the first sub-interface and the device information of the terminal devices in the first device group.

5082: The active vBNG-UP network element receives the reverse migration instruction, and migrates the network traffic of the terminal devices in the first device group to the first interface based on the interface identifier of the first interface and the device information of the terminal devices in the first device group that are included in the reverse migration instruction.

The active vBNG-UP network element determines the first interface based on the interface identifier of the first interface, sends the device identifier of the active vBNG-UP network element to each terminal device based on the device identifier of the terminal devices in the first device group, and sends a priority adjustment request to the CR, where the priority adjustment request includes the address segment of the first interface. The CR receives the priority adjustment request, where the priority adjustment request includes the address segment of the first interface, and raises a priority of target routing information. The target routing information includes the address segment of the first interface and the device identifier of the second vBNG-UP network element. After the priority is raised, the priority of the target routing information is the highest in routing information including the address segment of the first interface.

Alternatively, when the reverse migration instruction includes the interface identifier of the second sub-interface and the device information of the terminal devices in the first device group, the active vBNG-UP network element determines the first sub-interface based on the interface identifier of the first sub-interface, sends the device identifier of the active vBNG-UP network element to each terminal device based on the device identifier of the terminal devices in the first device group, and sends a priority adjustment request to the CR, where the priority adjustment request includes the address segment of the first sub-interface. The CR receives the priority adjustment request, where the priority adjustment request includes the address segment of the first sub-interface; and raises a priority of target routing information. The target routing information includes the address segment of the first sub-interface and the device identifier of the second vBNG-UP network element. After the priority is raised, the priority of the target routing information is the highest in routing information including the address segment of the first sub-interface.

In some embodiments of this application, the active vBNG-UP network element sends the interface identifier and the bandwidth usage parameter value of each interface on the active vBNG-UP network element to the controller, and the standby vBNG-UP network element corresponding to the active vBNG-UP network element sends the identifier and the bandwidth usage parameter value of each interface on the standby vBNG-UP network element to the controller. The controller may determine the first interface that is included in the active vBNG-UP network element and of which the bandwidth usage parameter value reaches the first threshold, and determine the second vBNG-UP network element and the second interface based on the sum of bandwidths occupied by the network traffic of the terminal devices in the first device group and the bandwidth usage parameter value of the standby interface corresponding to the first interface on the standby vBNG-UP network element. The second vBNG-UP network element is a standby vBNG-UP network element, the second interface is a standby interface that corresponds to the first interface and that is on the second vBNG-UP network element, and the bandwidth usage parameter value of the second interface reaches the second threshold. The controller migrates the network traffic on the first interface to the second interface on the second vBNG-UP network element, so that an amount of network traffic on the first interface on the active vBNG-UP network element can be reduced, and the bandwidth usage of the first interface on the active vBNG-UP network element can be reduced, avoiding a problem such as traffic congestion on the active vBNG-UP network element.

Figure 8:
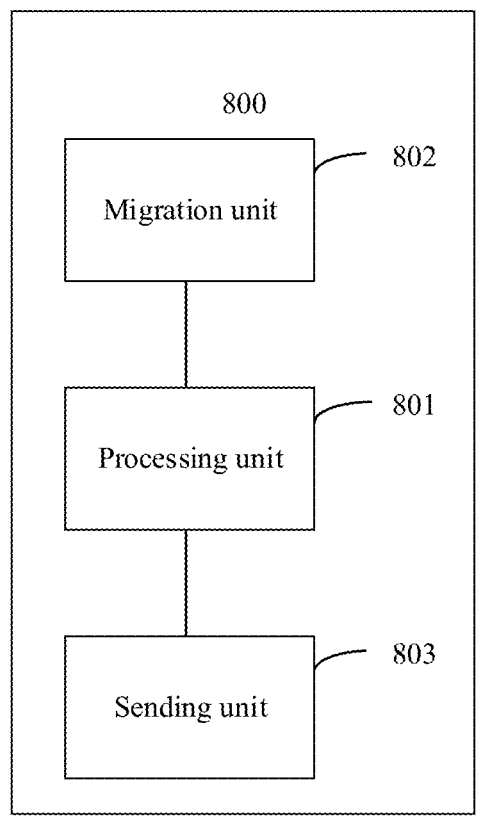
FIG. 8 is a schematic diagram of a structure of a network traffic migration apparatus according to an embodiment of this application.

FIG. 8 shows a network traffic migration apparatus 800 provided in an embodiment of this application. The apparatus 800 may be deployed on the controller or the vBNG-CP network element in any one of the foregoing embodiments, and includes:

a processing unit 801, configured to obtain a bandwidth usage parameter value of each of M vBNG-UP network elements, where M is an integer greater than 1; and when a bandwidth usage parameter value of a first vBNG-UP network element reaches a first threshold, determine a second vBNG-UP network element based on a sum of bandwidths occupied by to-be-migrated network traffic of terminal devices in a first device group on the first vBNG-UP network element and a bandwidth usage parameter value of vBNG-UP network elements in a vBNG-UP network element group, where the first vBNG-UP network element and the second vBNG-UP network element are vBNG-UP network elements in the M vBNG-UP network elements, and the vBNG-UP network element group includes vBNG-UP network elements in the M vBNG-UP network elements except the first vBNG-UP network element; and a migration unit 802, configured to migrate the to-be-migrated network traffic of the terminal devices in the first device group to the second vBNG-UP network element.

Optionally, a bandwidth usage parameter value of any one of the M vBNG-UP network elements includes a bandwidth usage parameter value of each interface on the vBNG-UP network element.

Optionally, the processing unit 801 is configured to:
when a bandwidth usage parameter value of a first interface on the first vBNG-UP network element reaches the first threshold, predict, based on the sum of bandwidths occupied by the network traffic of the terminal devices in the first device group and a bandwidth usage parameter value of a second interface, a bandwidth usage parameter value of the second interface after the network traffic of the terminal devices in the first device group is migrated to the second interface; and
when the predicted bandwidth usage parameter value reaches a second threshold, determine that a vBNG-UP network element on which the second interface is located is the second vBNG-UP network element, where
the second interface is an interface on a vBNG-UP network element in the vBNG-UP network element group, and the network traffic of the terminal devices in the first device group is network traffic transmitted on the first interface.

Optionally, the migration unit 802 is configured to migrate the network traffic of the terminal devices in the first device group to the second interface.

Optionally, the processing unit 801 is configured to:
obtain an occupied bandwidth of the second interface based on a total bandwidth corresponding to the second interface and the bandwidth usage parameter value of the second interface; and
obtain, based on the sum of bandwidths occupied by the network traffic of the terminal devices in the first device group and the occupied bandwidth of the second interface, a bandwidth usage parameter value of the second interface after the network traffic of the terminal devices in the first device group is migrated to the second interface.

Optionally, the vBNG-UP network elements in the vBNG-UP network element group are standby vBNG-UP network elements of the first vBNG-UP network element, the standby vBNG-UP network elements include one or more standby interfaces corresponding to the first interface, and an address segment of the standby interface includes an address segment of the first interface.

The processing unit 801 is further configured to select an interface from the standby interfaces corresponding to the first interface as the second interface.

Optionally, the first interface is a network-side interface on the first vBNG-UP network element, and the network traffic of the terminal devices in the first device group is network traffic transmitted on a user-side interface corresponding to the first interface on the first vBNG-UP network element.

Optionally, the first interface includes a plurality of sub-interfaces, and the network traffic of the terminal devices in the first device group is network traffic transmitted on the sub-interfaces of the first interface.

Optionally, the processing unit 801 is further configured to:
obtain the bandwidth usage parameter value of the first interface on the first vBNG-UP network element; and
when the bandwidth usage parameter value of the first interface reaches a third threshold, migrate the network traffic of the terminal devices in the first device group back to the first interface on the first vBNG-UP network element.

Optionally, the processing unit 801 is configured to:
predict a bandwidth usage parameter value of the first interface after the network traffic of the terminal devices in the first device group is migrated back to the first interface; and
when the predicted bandwidth usage parameter value reaches a fourth threshold, migrate the network traffic of the terminal devices in the first device group back to the first interface on the first vBNG-UP network element.

Optionally, the apparatus 800 further includes:
a sending unit 803, configured to send a first migration request message to a vBNG-CP network element, where the first migration request message includes a device identifier of the first vBNG-UP network element, an interface identifier of the first interface, a device identifier of the second vBNG-UP network element, and an interface identifier of the second interface, and the first migration request message is used to trigger the vBNG-CP network element to migrate, to the second interface, the network traffic of the terminal devices that is transmitted on the first interface; or
a sending unit 803, configured to send a second migration request message to the second vBNG-UP network element, where the second migration request message includes device information of the terminal devices in the first device group and an interface identifier of the second interface, the device information of the terminal devices includes device identifiers of the terminal devices, and the second migration request message is used to trigger the second vBNG-UP network element to migrate, based on the device information of the terminal devices in the first device group and the interface identifier of the second interface, the network traffic of the terminal devices in the first device group to the second interface.

Optionally, the vBNG-UP network element group further includes the first vBNG-UP network element, the first vBNG-UP network element is the second vBNG-UP network element, the second interface is an interface on the first vBNG-UP network element, and the first interface is different from the second interface.

In some embodiments of this application, the migration unit may migrate the to-be-migrated network traffic of the terminal devices in the first device group from the first vBNG-UP network element to the second vBNG-UP network element. This can avoid the problem that the sum of bandwidths occupied by the network traffic on the first vBNG-UP network element approaches or reaches the total bandwidth of the first vBNG-UP network element, and further avoids a problem such as traffic congestion on the first vBNG-UP network element. In addition, the processing unit determines the second vBNG-UP network element based on the sum of bandwidths occupied by the to-be-migrated network traffic of the terminal devices in the first device group on the first vBNG-UP network element and the bandwidth usage parameter values of the vBNG-UP network elements in the vBNG-UP network element group. In this way, the migration unit migrates the to-be-migrated network traffic of the terminal devices in the first device group to the second vBNG-UP network element. Therefore, after the network traffic is migrated to the second vBNG-UP network element, it is avoided that the sum of bandwidths occupied by the network traffic on the second vBNG-UP network element approaches or reaches the total bandwidth of the second vBNG-UP network element, and a problem such as traffic congestion on the second vBNG-UP network element is also avoided.

Figure 9:
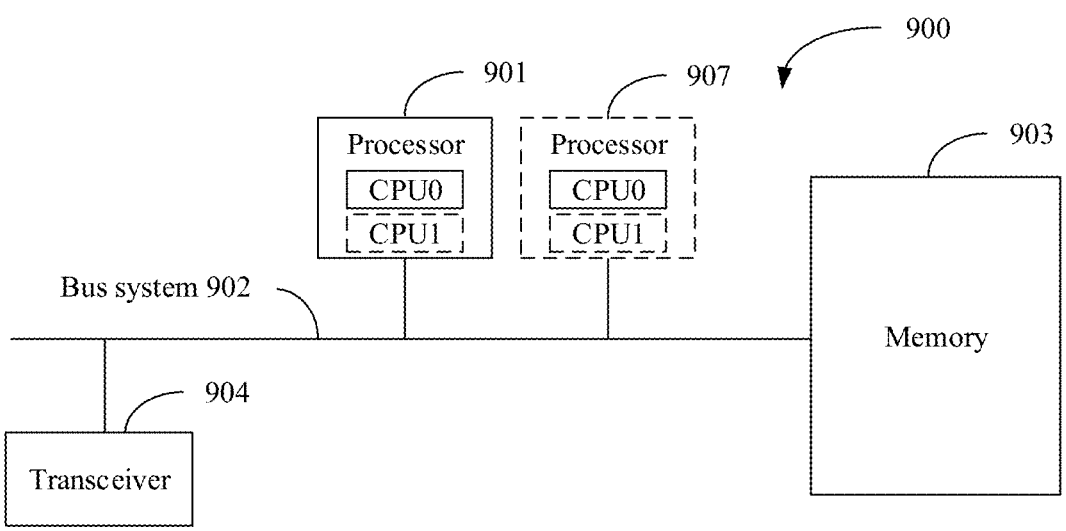
FIG. 9 is a schematic diagram of a structure of another network traffic migration apparatus according to an embodiment of this application.

FIG. 9 is a schematic diagram of a network traffic migration apparatus 900 according to an embodiment of this application. The apparatus 900 includes at least one processor 901, a bus system 902, a memory 903, and at least one transceiver 904.

The apparatus 900 is an apparatus of a hardware structure, and can be configured to implement the function modules in the apparatus 800 shown in FIG. 8. For example, a person skilled in the art may figure out that the processing unit 801 and the migration unit 802 in the apparatus 800 shown in FIG. 8 may be implemented by invoking code in the memory 903 by the at least one processor 901, and the sending unit 803 in the apparatus 800 shown in FIG. 8 may be implemented by the transceiver 904.

Optionally, the apparatus 900 may further be configured to implement a function of the collection analysis device in any one of the foregoing embodiments.

Optionally, the processor 901 may be a general-purpose central processing unit (CPU), a microprocessor, an application-specific integrated circuit (ASIC), or one or more integrated circuits for controlling program execution of the solutions of this application.

The bus system 902 may include a path for transmitting information between the foregoing components.

The transceiver 904 is configured to communicate with another device or a communications network.

The memory 903 may be a read-only memory (ROM) or another type of static storage device that can store static information and instructions, a random access memory (RAM) or another type of dynamic storage device that can store information and instructions; or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, or the like), and a disk storage medium or another disk storage device, or any other medium that can be used to carry or store expected program code in a form of instructions or a data structure and that can be accessed by a computer. However, the memory 903 is not limited herein. The memory may exist independently, and is connected to the processor through the bus. Alternatively, the memory may be integrated into the processor.

The memory 903 is configured to store application program code for executing the solutions in this application, and the processor 501 controls execution of the application program code. The processor 901 is configured to execute the application program code stored in the memory 903, so that the migration apparatus 900 implements a function in the method in this patent.

In some embodiments, the processor 901 may include one or more CPUs, for example, a CPU 0 and a CPU 1 in FIG. 9.

In some embodiments, the apparatus 900 may include a plurality of processors, for example, the processor 901 and a processor 907 shown in FIG. 9. Each of the processors may be a single-core (single-CPU) processor, or may be a multi-core (multi-CPU) processor. The processor herein may be one or more devices, circuits, and/or processing cores for processing data (for example, computer program instructions).

A person of ordinary skill in the art may understand that all or some of the steps of the foregoing embodiments may be implemented by hardware or a program instructing related hardware. The program may be stored in a computer-readable storage medium. The storage medium may include: a read-only memory, a magnetic disk, or an optical disc.

The foregoing description is merely an embodiment of this application, but is not intended to limit this application. Any modification, equivalent replacement, or improvement made without departing from the principle of this application shall fall within the protection scope of this application.

What is claimed is:

1. A network device comprising:
   at least one processor;
   one or more memories coupled to the at least one processor and storing programming instructions, wherein the at least one processor is configured to execute the programming instructions to cause the network device to:
   obtain a bandwidth usage parameter value of each of M virtual broadband network gateway user plane (vBNG-UP) network elements, wherein M is an integer greater than 1;
   when a bandwidth usage parameter value of a first vBNG-UP network element reaches a first threshold, determine a second vBNG-UP network element based on a sum of bandwidths occupied by to-be-migrated network traffic of one or more terminal devices in a first device group on the first vBNG-UP network element and a bandwidth usage parameter value of one or more vBNG-UP network elements in a vBNG-UP network element group, wherein the first vBNG-UP network element and the second vBNG-UP network element are vBNG-UP network elements in the M vBNG-UP network elements, and the vBNG-UP network element group comprises vBNG-UP network elements in the M vBNG-UP network elements except the first vBNG-UP network element; and
   migrate the to-be-migrated network traffic of the terminal devices in the first device group to the second vBNG-UP network element.

2. The network device according to claim 1, wherein a bandwidth usage parameter value of any one of the M vBNG-UP network elements comprises a bandwidth usage parameter value of each interface on the vBNG-UP network element.

3. The network device according to claim 1, wherein the programming instructions, when executed by the at least one processor, further cause the network device to:
   when a bandwidth usage parameter value of a first interface on the first vBNG-UP network element reaches the first threshold, predict, based on the sum of bandwidths occupied by the network traffic of the terminal devices in the first device group and a bandwidth usage parameter value of a second interface, a bandwidth usage parameter value of the second interface after the network traffic of the terminal devices in the first device group is migrated to the second interface; and
   when the predicted bandwidth usage parameter value reaches a second threshold, determine that a vBNG-UP network element on which the second interface is located is the second vBNG-UP network element, wherein
   the second interface is an interface on a vBNG-UP network element in the vBNG-UP network element group, and the network traffic of the terminal devices in the first device group is network traffic transmitted on the first interface.

4. The network device according to claim 3, wherein the programming instructions, when executed by the at least one processor, further cause the network device to:
migrate the network traffic of the terminal devices in the first device group to the second interface.

5. The network device according to claim 3, wherein the programming instructions, when executed by the at least one processor, further cause the network device to:
obtain an occupied bandwidth of the second interface based on a total bandwidth corresponding to the second interface and the bandwidth usage parameter value of the second interface; and
obtain, based on the sum of bandwidths occupied by the network traffic of the terminal devices in the first device group and the occupied bandwidth of the second interface, a bandwidth usage parameter value of the second interface after the network traffic of the terminal devices in the first device group is migrated to the second interface.

6. The network device according to claim 3, wherein the vBNG-UP network elements in the vBNG-UP network element group are standby vBNG-UP network elements of the first vBNG-UP network element, the standby vBNG-UP network elements comprises one or more standby interfaces corresponding to the first interface, and an address segment of the standby interface comprises an address segment of the first interface; and
the programming instructions, when executed by the at least one processor, further cause the network device to:
select an interface from the standby interfaces corresponding to the first interface as the second interface.

7. The network device according to claim 3, wherein the first interface is a network-side interface on the first vBNG-UP network element, the network traffic of the terminal devices in the first device group is network traffic transmitted on a user-side interface corresponding to the first interface on the first vBNG-UP network element.

8. The network device according to claim 3, wherein the first interface comprises a plurality of sub-interfaces, and the network traffic of the terminal devices in the first device group is network traffic transmitted on the sub-interfaces comprised in the first interface.

9. The network device according to claim 3, wherein the programming instructions, when executed by the at least one processor, further cause the network device to:
obtain the bandwidth usage parameter value of the first interface on the first vBNG-UP network element; and
when the bandwidth usage parameter value of the first interface reaches a third threshold, migrate the network traffic of the terminal devices in the first device group back to the first interface on the first vBNG-UP network element.

10. The network device according to claim 9, wherein the network device is further caused to:
predict a bandwidth usage parameter value of the first interface after the network traffic of the terminal devices in the first device group is migrated back to the first interface; and
when the predicted bandwidth usage parameter value reaches a fourth threshold, migrate the network traffic of the terminal devices in the first device group back to the first interface on the first vBNG-UP network element.

11. The network device according to claim 3, wherein the programming instructions, when executed by the at least one processor, further cause the network device to:
send a first migration request message to a virtual broadband network gateway control plane vBNG-CP network element, wherein the first migration request message comprises a device identifier of the first vBNG-UP network element, an interface identifier of the first interface, a device identifier of the second vBNG-UP network element, and an interface identifier of the second interface, and the first migration request message is used to trigger the vBNG-CP network element to migrate, to the second interface, the network traffic of the terminal devices that is transmitted on the first interface.

12. The network device according to claim 3, wherein the programming instructions, when executed by the at least one processor, further cause the network device to:
send a second migration request message to the second vBNG-UP network element, wherein the second migration request message comprises device information of the terminal devices in the first device group and an interface identifier of the second interface, the device information of the terminal devices comprises device identifiers of the terminal devices, and the second migration request message is used to trigger the second vBNG-UP network element to migrate, based on the device information of the terminal devices in the first device group and the interface identifier of the second interface, the network traffic of the terminal devices in the first device group to the second interface.

13. The network device according to claim 3, wherein the vBNG-UP network element group further comprises the first vBNG-UP network element, the first vBNG-UP network element is the second vBNG-UP network element, the second interface is an interface on the first vBNG-UP network element, and the first interface is different from the second interface.

14. A network traffic migration method, wherein the method comprises:
obtaining a bandwidth usage parameter value of each of M virtual broadband network gateway user plane (vBNG-UP) network elements, wherein M is an integer greater than 1;
when a bandwidth usage parameter value of a first vBNG-UP network element reaches a first threshold, determining a second vBNG-UP network element based on a sum of bandwidths occupied by to-be-migrated network traffic of one or more terminal devices in a first device group on the first vBNG-UP network element and a bandwidth usage parameter value of one or more vBNG-UP network elements in a vBNG-UP network element group, wherein the first vBNG-UP network element and the second vBNG-UP network element are vBNG-UP network elements in the M vBNG-UP network elements, and the vBNG-UP network element group comprises vBNG-UP network elements in the M vBNG-UP network elements except the first vBNG-UP network element; and
migrating the to-be-migrated network traffic of the terminal devices in the first device group to the second vBNG-UP network element.

15. The method according to claim 14, wherein a bandwidth usage parameter value of any one of the M vBNG-UP network elements comprises a bandwidth usage parameter value of each interface on the vBNG-UP network element.

16. The method according to claim 14, wherein the determining of a second vBNG-UP network element comprises:

when a bandwidth usage parameter value of a first interface on the first vBNG-UP network element reaches the first threshold, predicting, based on the sum of bandwidths occupied by the network traffic of the terminal devices in the first device group and a bandwidth usage parameter value of a second interface, a bandwidth usage parameter value of the second interface after the network traffic of the terminal devices in the first device group is migrated to the second interface; and when the predicted bandwidth usage parameter value reaches a second threshold, determining that a vBNG-UP network element on which the second interface is located is the second vBNG-UP network element, wherein the second interface is an interface on a vBNG-UP network element in the vBNG-UP network element group, and the network traffic of the terminal devices in the first device group is network traffic transmitted on the first interface.

17. A network system, comprising a network device, wherein the network device is configured to:

obtain a bandwidth usage parameter value of each of M virtual broadband network gateway user plane (vBNG-UP) network elements, wherein M is an integer greater than 1;

when a bandwidth usage parameter value of a first vBNG-UP network element reaches a first threshold, determine a second vBNG-UP network element based on a sum of bandwidths occupied by to-be-migrated network traffic of one or more terminal devices in a first device group on the first vBNG-UP network element and a bandwidth usage parameter value of one or more vBNG-UP network elements in a vBNG-UP network element group, wherein the first vBNG-UP network element and the second vBNG-UP network element are vBNG-UP network elements in the M vBNG-UP network elements, and the vBNG-UP network element group comprises vBNG-UP network elements in the M vBNG-UP network elements except the first vBNG-UP network element; and migrate the to-be-migrated network traffic of the terminal devices in the first device group to the second vBNG-UP network element.

18. The network system according to claim 17, wherein a bandwidth usage parameter value of any one of the M vBNG-UP network elements comprises a bandwidth usage parameter value of each interface on the vBNG-UP network element.

19. The network system according to claim 17, wherein the network device is further configured to:

when a bandwidth usage parameter value of a first interface on the first vBNG-UP network element reaches the first threshold, predict, based on the sum of bandwidths occupied by the network traffic of the terminal devices in the first device group and a bandwidth usage parameter value of a second interface, a bandwidth usage parameter value of the second interface after the network traffic of the terminal devices in the first device group is migrated to the second interface; and when the predicted bandwidth usage parameter value reaches a second threshold, determine that a vBNG-UP network element on which the second interface is located is the second vBNG-UP network element, wherein the second interface is an interface on a vBNG-UP network element in the vBNG-UP network element group, and the network traffic of the terminal devices in the first device group is network traffic transmitted on the first interface.

20. The network system according to claim 19, wherein the network device is further configured to:

migrate the network traffic of the terminal devices in the first device group to the second interface.

* * * * *